United States Patent
Nogami et al.

(10) Patent No.: US 10,147,937 B2
(45) Date of Patent: Dec. 4, 2018

(54) SOLID-STATE BATTERY AND METHOD FOR MANUFACTURING ELECTRODE ACTIVE MATERIAL

(71) Applicants: MITSUBISHI GAS CHEMICAL COMPANY, INC., Tokyo (JP); TOHOKU TECHNO ARCH CO., LTD., Miyagi (JP)

(72) Inventors: Genki Nogami, Niigata (JP); Mitsugu Taniguchi, Niigata (JP); Masaru Tazawa, Niigata (JP); Atsushi Unemoto, Miyagi (JP); Motoaki Matsuo, Miyagi (JP); Shinichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

( * ) Notice: Subject to any disclaimer, the term of this patent is extended or adjusted under 35 U.S.C. 154(b) by 41 days.

(21) Appl. No.: 14/913,166

(22) PCT Filed: Aug. 27, 2014

(86) PCT No.: PCT/JP2014/072439
§ 371 (c)(1),
(2) Date: Feb. 19, 2016

(87) PCT Pub. No.: WO2015/030053
PCT Pub. Date: Mar. 5, 2015

(65) Prior Publication Data
US 2016/0204466 A1     Jul. 14, 2016

(30) Foreign Application Priority Data

Sep. 2, 2013 (JP) .................. 2013-181579
Sep. 13, 2013 (JP) .................. 2013-191048
(Continued)

(51) Int. Cl.
*H01M 10/0562* (2010.01)
*H01M 4/136* (2010.01)
(Continued)

(52) U.S. Cl.
CPC ......... *H01M 4/136* (2013.01); *H01M 4/0404* (2013.01); *H01M 4/0471* (2013.01);
(Continued)

(58) Field of Classification Search
CPC .. H01M 4/136; H01M 4/0404; H01M 4/0471; H01M 4/137; H01M 4/1399;
(Continued)

(56) References Cited

U.S. PATENT DOCUMENTS

2006/0292449 A1  12/2006 Ota
2010/0086843 A1  4/2010 Kawai et al.
(Continued)

FOREIGN PATENT DOCUMENTS

JP   2000-223156   8/2000
JP   3149524      1/2001
(Continued)

OTHER PUBLICATIONS

Akihiro Yamauchi et al., "Preparation and ionic conductivities of (100-χ) (075Li$_2$S•0.25P$_2$S$_5$)•χLiBH$_4$ glass electrolytes"; Journal of Power Sources; vol. 244; Dec. 10, 2012; pp. 707-710.
(Continued)

*Primary Examiner* — Jane J Rhee
(74) *Attorney, Agent, or Firm* — Greenblum & Bernstein, P.L.C.

(57) ABSTRACT

One embodiment provides a solid-state battery that has a positive-electrode layer; a negative-electrode layer; and a lithium-ion-conducting solid electrolyte layer disposed between the positive-electrode layer and the negative-electrode layer. The positive-electrode layer contains a positive-
(Continued)

electrode active material and a solid electrolyte comprising a hydride of a complex. Said positive-electrode active material is sulfur-based, and the solid electrolyte layer contains a solid electrolyte comprising a hydride of a complex.

5 Claims, 10 Drawing Sheets

(30) Foreign Application Priority Data

Mar. 28, 2014 (JP) .................. 2014-067825
Mar. 28, 2014 (JP) .................. 2014-067826

(51) Int. Cl.

| | |
|---|---|
| H01M 4/04 | (2006.01) |
| H01M 4/137 | (2010.01) |
| H01M 4/1399 | (2010.01) |
| H01M 4/36 | (2006.01) |
| H01M 4/587 | (2010.01) |
| H01M 4/60 | (2006.01) |
| H01M 10/0525 | (2010.01) |
| H01M 4/1397 | (2010.01) |
| H01M 4/38 | (2006.01) |
| H01M 4/58 | (2010.01) |
| H01M 10/052 | (2010.01) |
| H01M 4/62 | (2006.01) |

(52) U.S. Cl.
CPC ......... *H01M 4/137* (2013.01); *H01M 4/1397* (2013.01); *H01M 4/1399* (2013.01); *H01M 4/364* (2013.01); *H01M 4/38* (2013.01); *H01M 4/587* (2013.01); *H01M 4/5815* (2013.01); *H01M 4/604* (2013.01); *H01M 4/62* (2013.01); *H01M 10/052* (2013.01); *H01M 10/0525* (2013.01); *H01M 10/0562* (2013.01); *H01M 2220/20* (2013.01); *H01M 2220/30* (2013.01); *H01M 2300/0068* (2013.01); *Y02T 10/7011* (2013.01)

(58) Field of Classification Search
CPC ...... H01M 4/364; H01M 4/587; H01M 4/604; H01M 4/1397; H01M 4/38; H01M 4/5815; H01M 4/62; H01M 10/0525; H01M 10/0562; H01M 10/052; H01M 10/7011; H01M 2220/20; H01M 2220/30; H01M 2300/0068
See application file for complete search history.

(56) References Cited

U.S. PATENT DOCUMENTS

| | | | |
|---|---|---|---|
| 2011/0117440 A1 | 5/2011 | Maekawa et al. | |
| 2011/0200875 A1 | 8/2011 | Miyuki et al. | |
| 2011/0244334 A1 | 10/2011 | Kawada | |
| 2012/0251871 A1 | 10/2012 | Suzuki et al. | |
| 2013/0040208 A1 | 2/2013 | Kanno et al. | |
| 2013/0284988 A1 | 10/2013 | Satake et al. | |
| 2013/0295464 A1 | 11/2013 | Yanagi et al. | |

FOREIGN PATENT DOCUMENTS

| | | |
|---|---|---|
| JP | 3163741 | 3/2001 |
| JP | 3343934 | 8/2002 |
| JP | 2003-68361 | 3/2003 |
| JP | 2006-277997 | 10/2006 |
| JP | 2008-147015 | 6/2008 |
| JP | 4165536 | 8/2008 |
| JP | 4779985 | 7/2011 |
| JP | 2011-150942 | 8/2011 |
| JP | 2011-222153 | 11/2011 |
| JP | 2011-249507 | 12/2011 |
| JP | 2011-249517 | 12/2011 |
| JP | 2012-38686 | 2/2012 |
| JP | 2012-43646 | 3/2012 |
| JP | 2012-150934 | 8/2012 |
| JP | 2012-204306 | 10/2012 |
| JP | 2012-204310 | 10/2012 |
| JP | 2012-209104 | 10/2012 |
| JP | 2012-209106 | 10/2012 |
| JP | 2012-209195 | 10/2012 |
| JP | 2011009203 | 1/2013 |
| JP | 2013008611 | 1/2013 |
| JP | 5187703 | 2/2013 |
| JP | 2013157084 | 8/2013 |
| JP | 2014-120432 | 6/2014 |
| JP | 2014-160572 | 9/2014 |
| WO | 2009/139382 | 11/2009 |
| WO | 2010/044437 | 4/2010 |
| WO | 2011/118801 | 9/2011 |
| WO | 2012/102037 | 8/2012 |
| WO | 2013/080553 | 6/2013 |

OTHER PUBLICATIONS

James E. Trevey et al., "High Power Nanocomposite $TiS_2$ Cathodes for All-Solid-State Lithium Batteries"; Journal of Electrochemical Society, 158 (12); Nov. 1, 2011; pp. 1282-1289.
H. L. Tsai et al., "Exfoliated-Restacked Phase of $WS_2$"; Chemistry of Materials, 9; Apr. 16, 1997; pp. 879.
Extended European Search Report issued in Patent Application No. 14841219.0, dated Mar. 1, 2017.
"SEI Technical Review, vol. 167", Sep. 2005, pp. 54-60.
"Applied Physics Letters, 91", 2007, pp. 224103.
"Journal of the American Chemical Society, 131", 2009, pp. 894-895.
"Journal of Power Sources, 226", 2013, pp. 61-64.
"Electrochemistry Communications, 31", 2013, pp. 71-75.
Kuniaki Takahashi et al., "Suisokabutsu-kei Kotai Denkaishitsu o Mochiita Sen Kotai Denchi: TiS2 Seikyoku no Kento, vol. 150th", Abstracts of Japan Institute of Metals, 2012, pp. 373.
International Search Report issued in PCT/JP2014/072439, dated Oct. 7, 2014.
European Office Action from Application No. 14841219.0 dated Jan. 29, 2018.

[Figure 1]
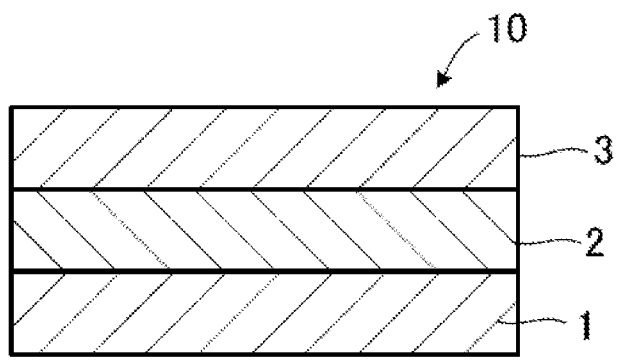
[Figure 2]
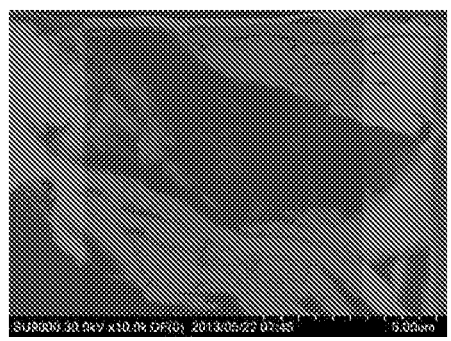

[Figure 3A]
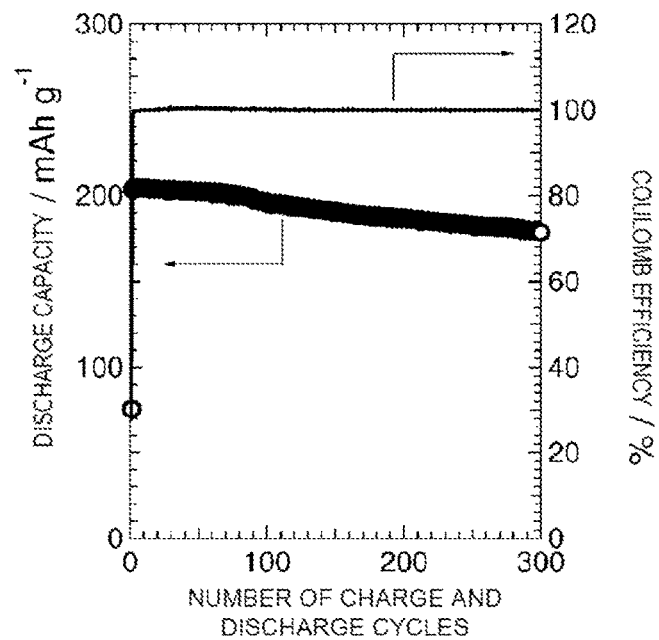
[Figure 3B]
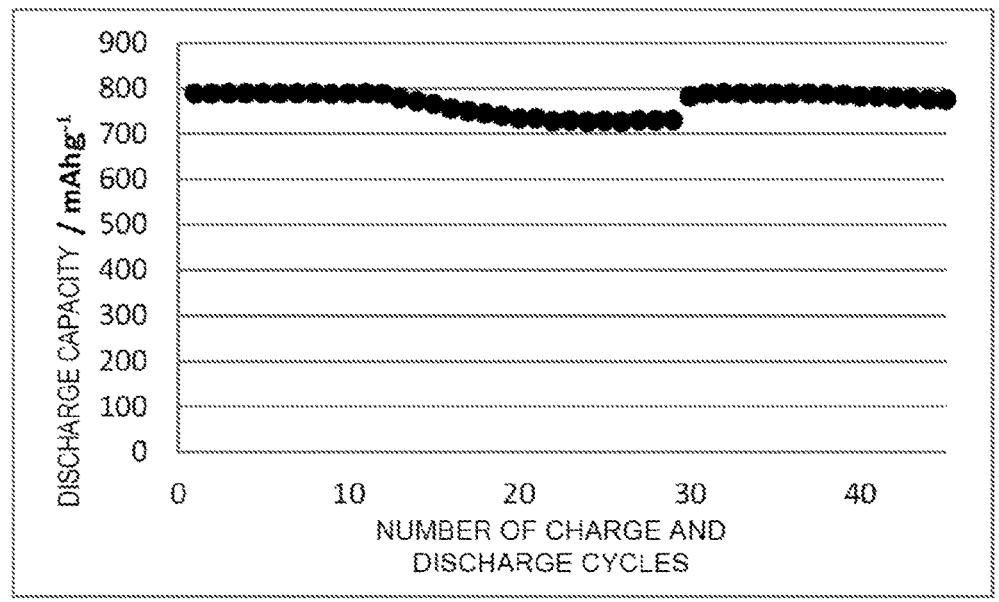

[Figure 3C]
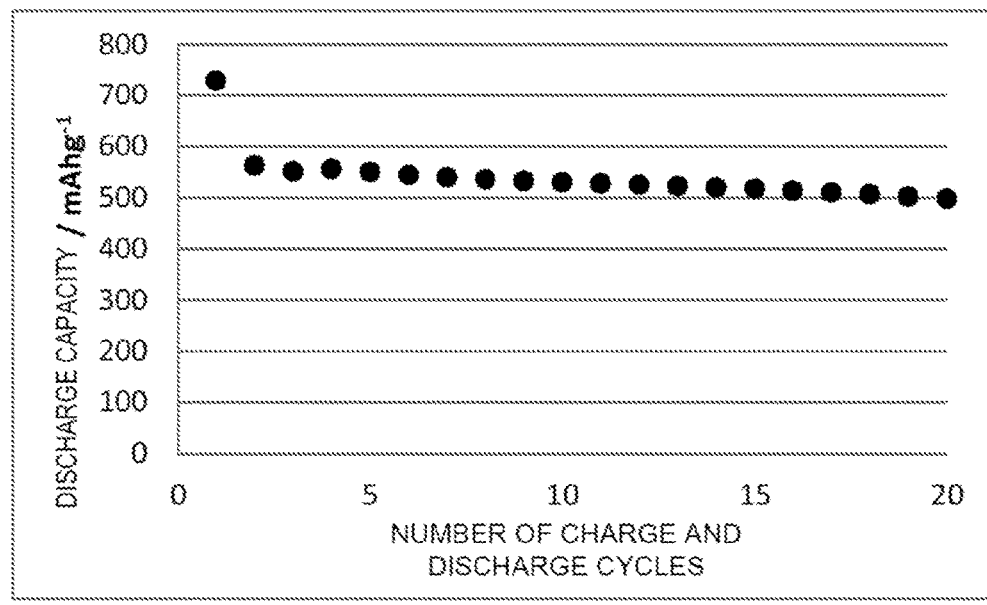
[Figure 3D]
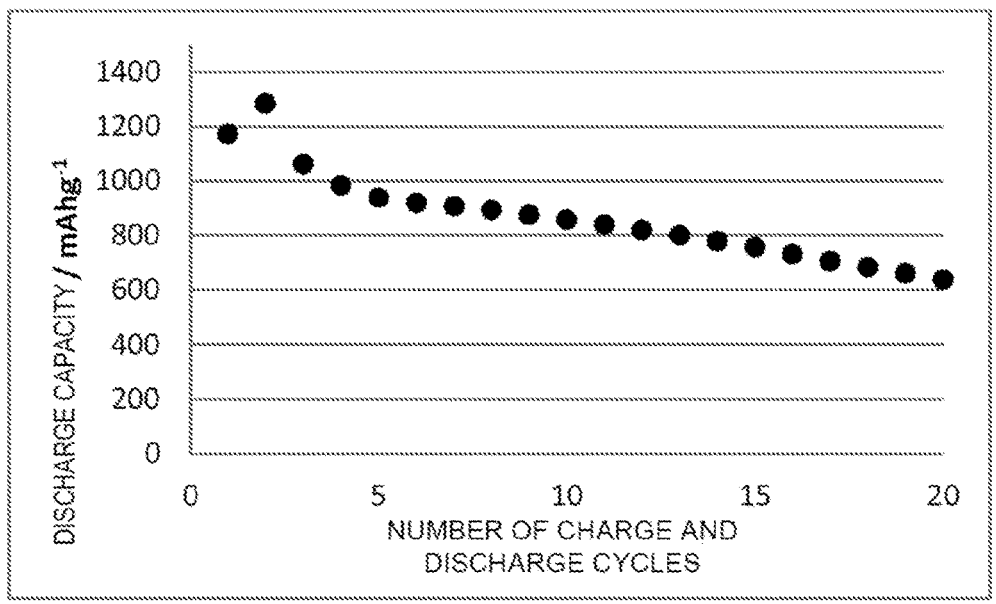

[Figure 3E]
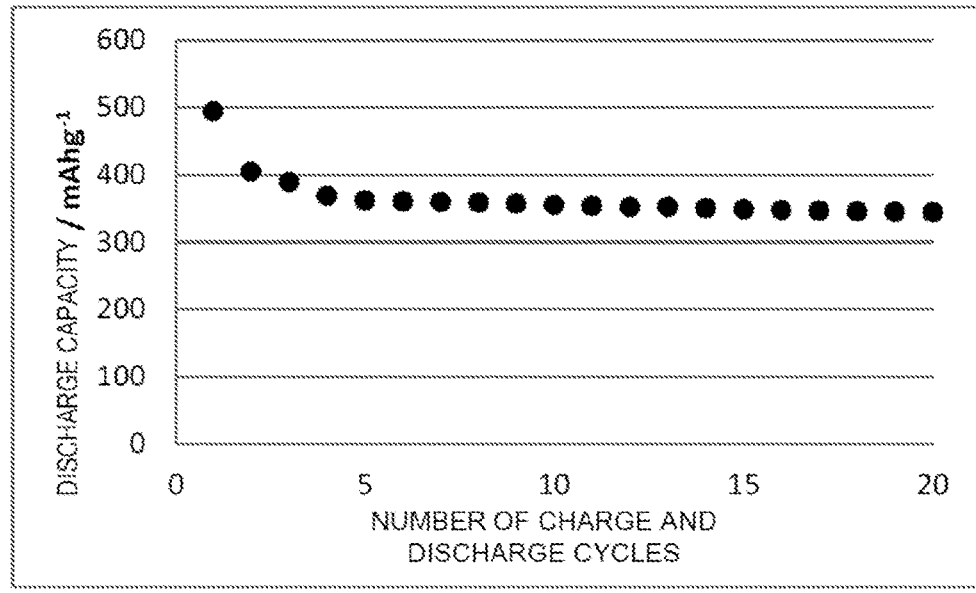
[Figure 3F]
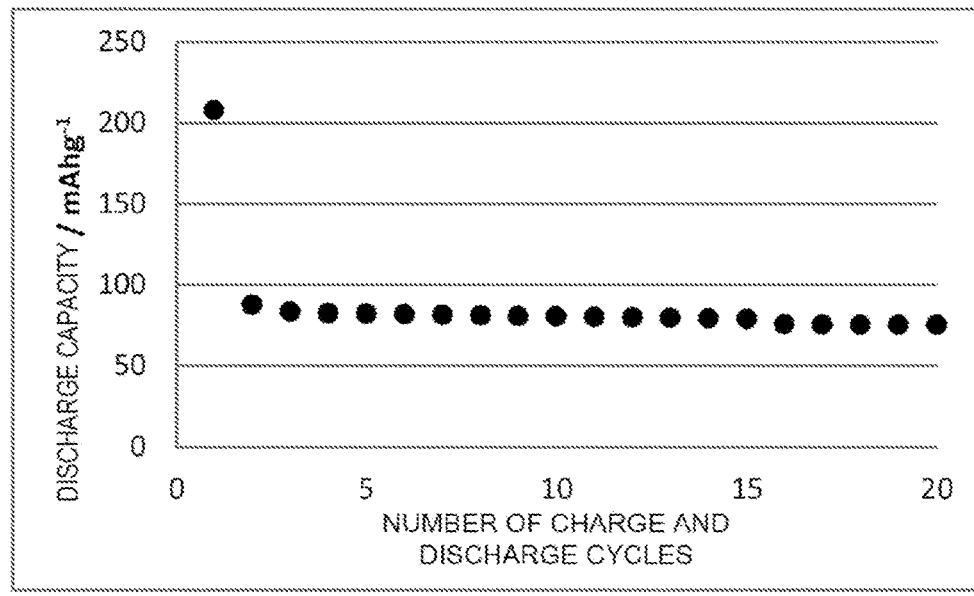

[Figure 4A]
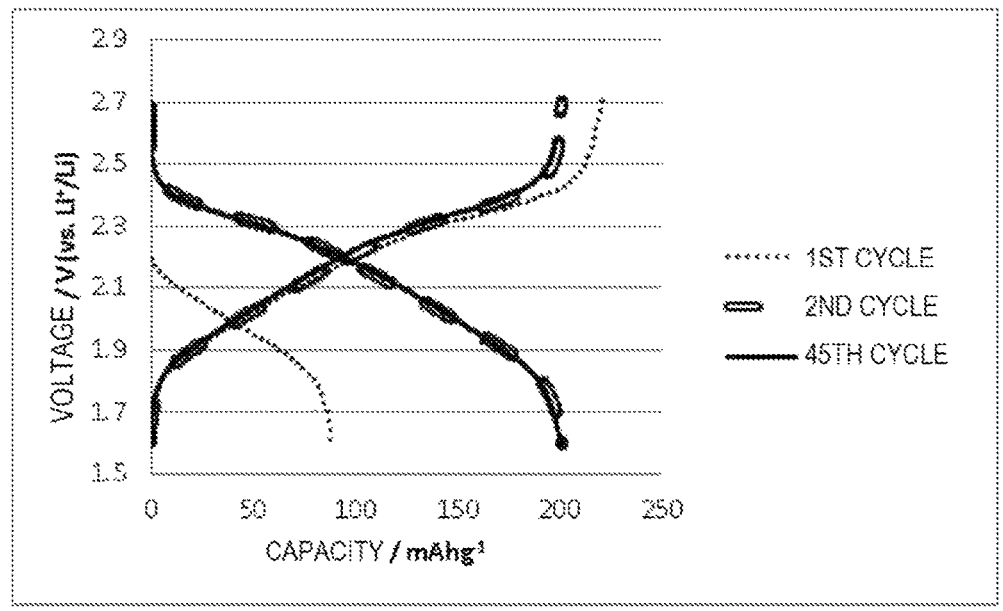
[Figure 4B]
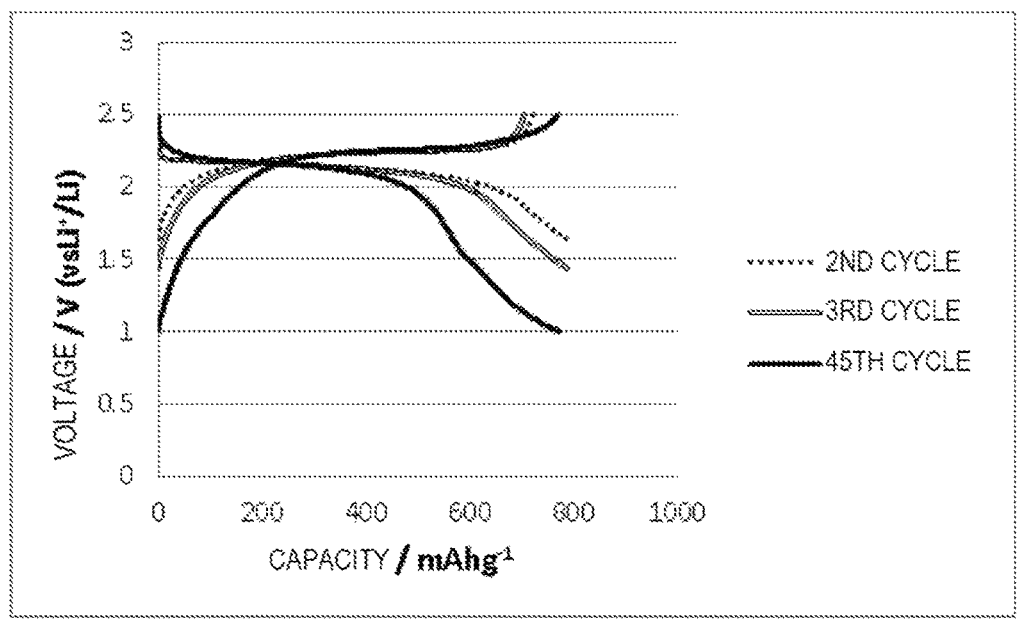

[Figure 4C]
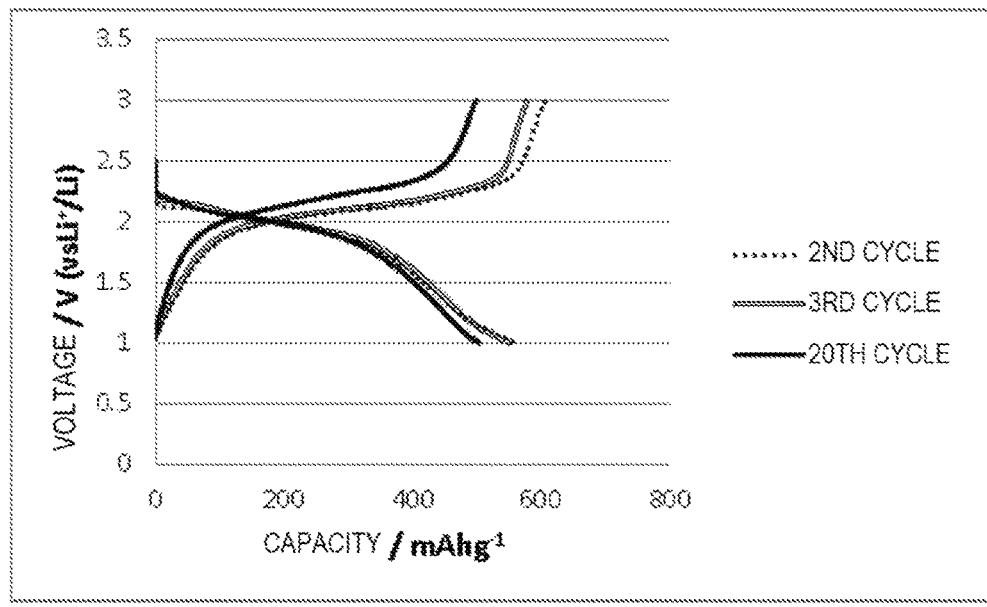
[Figure 5]
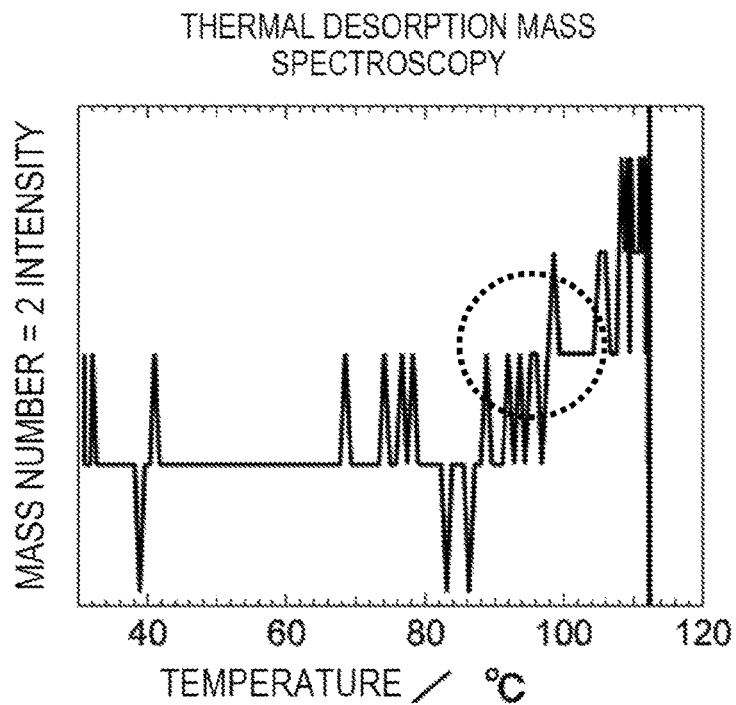

[Figure 6A]
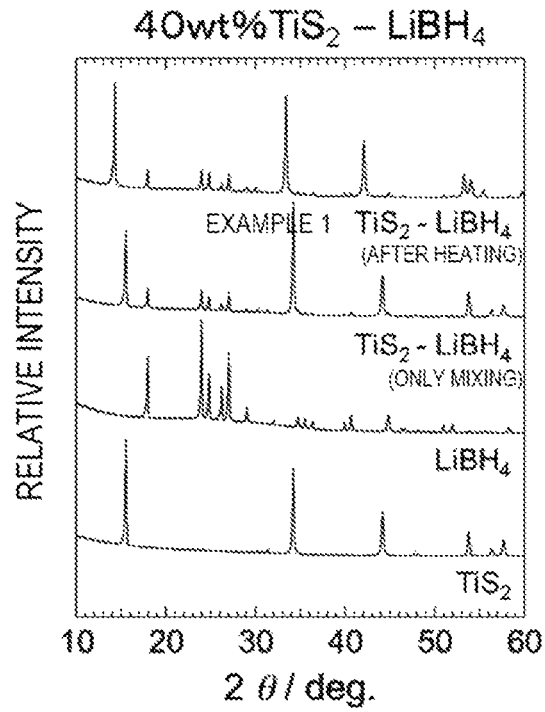
[Figure 6B]
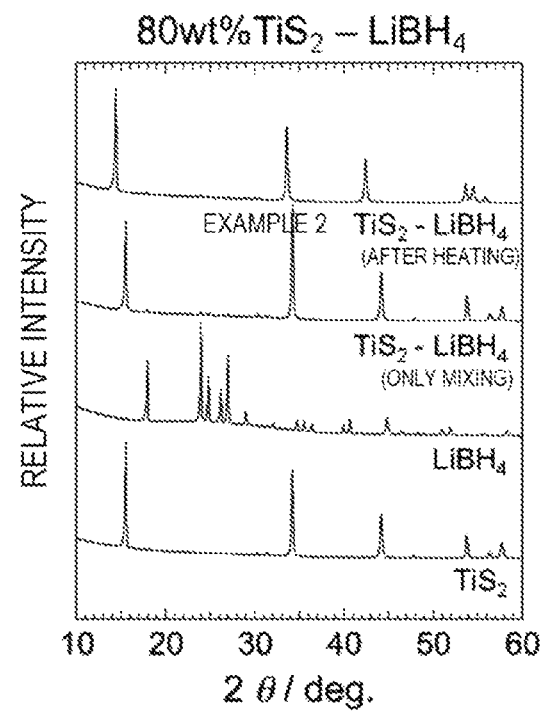

[Figure 6C]
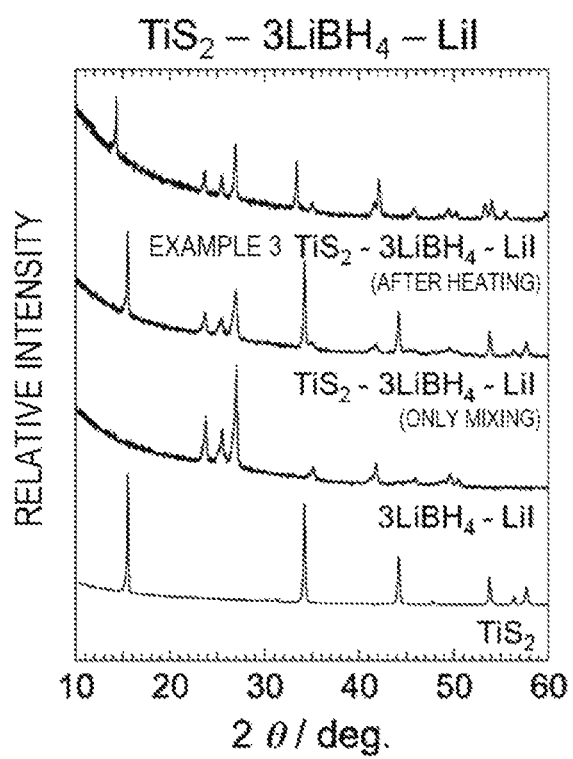

[Figure 7]
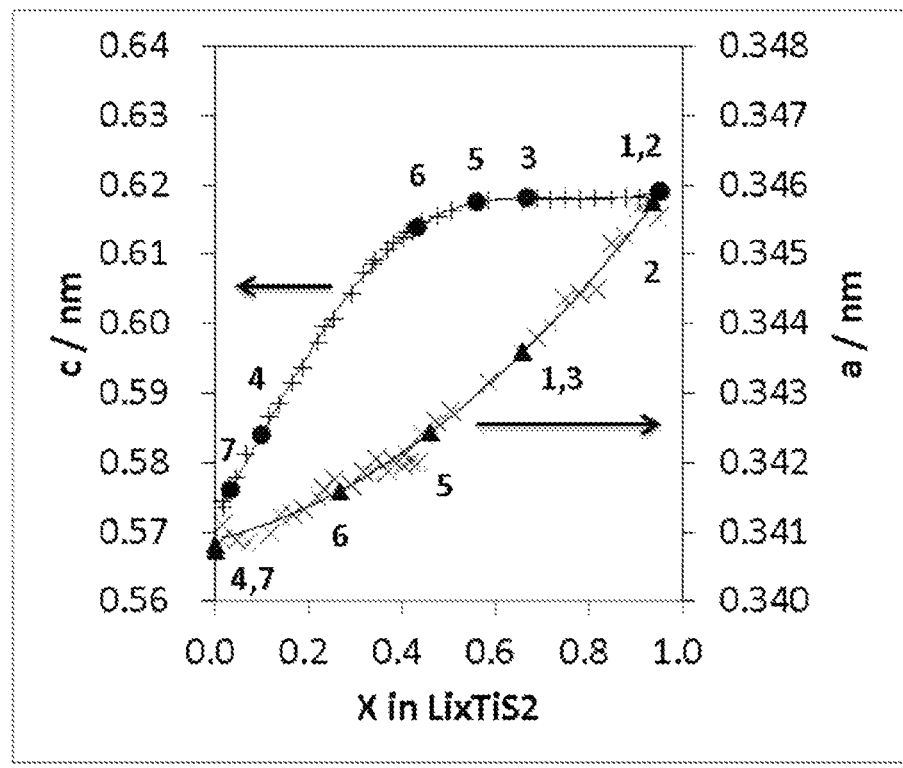
×  Plot of amount of lithium and a-axis lattice constant in previous report
+  Plot of amount of lithium and c-axis lattice constant in previous report
▲  Plot of amount of lithium and a-axis lattice constant in Examples 1 to 7
●  Plot of amount of lithium and c-axis lattice constant in Examples 1 to 7
: Solid State Comm.40(1981)245-248

[Figure 8]
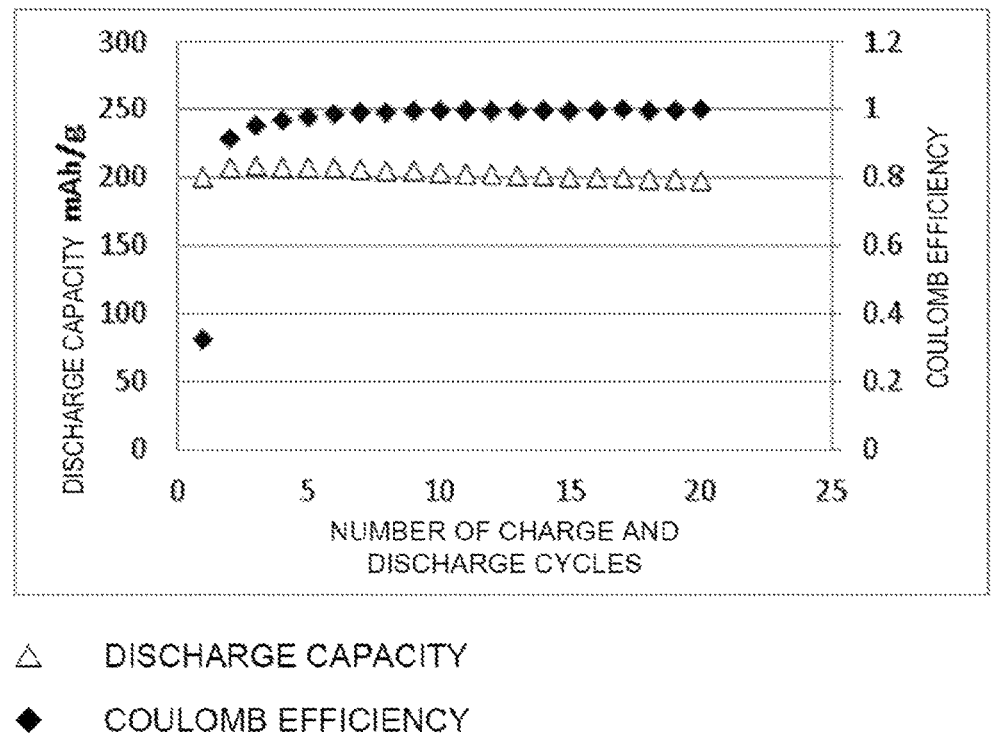
△ DISCHARGE CAPACITY
◆ COULOMB EFFICIENCY
[Figure 9]
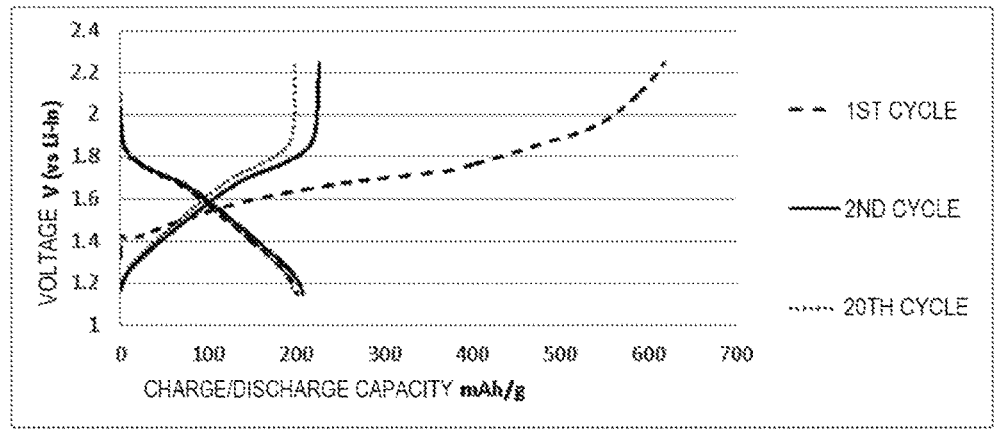

SOLID-STATE BATTERY AND METHOD FOR MANUFACTURING ELECTRODE ACTIVE MATERIAL

TECHNICAL FIELD

The present invention relates to a solid-state battery, particularly, to a solid-state battery in which lithium ions are responsible for electric conduction. Further, the present invention also relates to a method for manufacturing an electrode active material.

BACKGROUND ART

In recent years, there has been a growing demand for lithium ion secondary batteries in applications such as portable information terminals, portable electronic devices, electric cars, hybrid electric cars, and further stationary electric storage systems. However, existing lithium ion secondary batteries use flammable organic solvents as liquid electrolytes, and require rigid exteriors so as to prevent the leakage of the organic solvents. Further, there are constraints on the structure of devices, such as the need for portable personal computers or the like to have a structure against the risk in the case of leakage of the liquid electrolyte.

Furthermore, the applications extend even to movable vehicles such as automobiles and airplanes, and large capacity is required in stationary lithium ion secondary batteries. Further, high energy density is required in smartphones which have been spread rapidly and widely in recent years. Under such a situation, there is a tendency that the safety is considered to be more important than before, and the development of solid-state lithium ion secondary batteries without using toxic materials such as the organic solvents has been focused.

As a solid electrolyte in solid-state lithium ion secondary batteries, use of oxides, phosphate compounds, organic polymers, sulfides, and the like, has been investigated. However, oxides and phosphate compounds have low resistance to redox, and thus it is difficult for them to stably exist in lithium ion secondary batteries. Further, they also have a disadvantage that, when materials such as metal lithium, low crystalline carbon, and graphite, are used as a negative electrode, the solid electrolyte reacts with the negative electrode (Patent Literature 1).

Further, oxides and phosphate compounds have characteristics that their particles are hard. Accordingly, in order to form a solid electrolyte layer using these materials, sintering at a high temperature of 600° C. or more is generally required, which is time consuming. Furthermore, oxides and phosphate compounds, when used as a material of the solid-electrolyte layer, have a disadvantage that the interfacial resistance with the electrode active material increases. The organic polymers have a disadvantage that the lithium ion conductivity at room temperature is low, and the conductivity drastically decreases when the temperature decreases.

Meanwhile, it is known that sulfides have a high lithium ion conductivity of $1.0 \times 10^{-3}$ S/cm or higher (Patent Literature 2) and $0.2 \times 10^{-3}$ S/cm or higher (Patent Literature 3) at room temperature. Further, their particles are soft, which enables a solid electrolyte layer to be produced by cold pressing, and can easily make its contact interface a good state. However, in the case of using materials containing Ge or Si as a sulfide solid electrolyte material (Patent Literature 2 and Patent Literature 4), these materials have a problem of being susceptible to reduction. Further, there is also the following problem: when batteries are configured using negative-electrode active materials having an electrode potential of about 0 V (with reference to Li electrode) as typified by lithium metals or carbon electrode active materials which are capable of ensuring high voltage in a single cell (Patent Literature 4), the reduction reaction of the sulfide solid electrolyte occurs.

In order to prevent the aforementioned problems, a method of providing a coating on the surface of the negative-electrode active material (Patent Literature 5) and a method of engineering the composition of the solid electrolyte (Patent Literatures 6 to 10), for example, have been proposed. In particular, Patent Literature 10 uses a solid electrolyte containing $P_2S_5$, but a concern for a reaction with the negative-electrode active material remains, even in the case of using such a sulfide solid electrolyte (Non Patent Literature 1). Further, the stability of the negative electrode easily changes due to a slight amount of impurities in the solid-electrolyte layer, and its control is not easy. Under such circumstances, a solid electrolyte capable of forming a good interface with an adjacent material while having high lithium ion conductivity without adversely affecting the stability of the electrode active material has been desired.

As new lithium-ion-conducting solid electrolytes, it was reported in 2007 that the high temperature phase of $LiBH_4$ had high lithium ion conductivity (Non Patent Literature 2), and it was reported in 2009 that a solid solution obtained by adding LiI to $LiBH_4$ could maintain the high temperature phase at room temperature (Non Patent Literature 3 and Patent Literature 11; hereinafter, for example, an ion conductor containing a complex hydride such as $LiBH_4$ will be referred to also as a complex hydride solid electrolyte). Configurations of batteries using such a complex hydride solid electrolyte have been studied, and it is disclosed that they exert effects particularly in the case of using metal lithium as a negative electrode (Patent Literature 12 and Patent Literature 13).

However, the solid electrolyte containing $LiBH_4$ has a disadvantage of reducing oxides that are generally used as a positive-electrode active material such as $LiCoO_2$. As a technique for preventing this, it was reported that charge/discharge cycles at 120° C. could be achieved by coating a 100-nm $LiCoO_2$ layer formed by pulsed laser deposition (PLD) with about 10 nm of $Li_3PO_4$ (Non Patent Literature 4). However, this technique is not intended for bulk types, but for thin film batteries manufactured using vapor phase deposition, and therefore there are disadvantages that the capacity per cell cannot be ensured as much as in bulk types, and the productivity is also poor.

Although a method for avoiding the reduction by the complex hydride using a specific positive-electrode active material has been found, available positive-electrode active materials are exceptionally limited (such as polycyclic aromatic hydrocarbons with a polyacene skeletal structure and perovskite fluorides) (Patent Literature 12). Further, these positive-electrode active materials are not oxide positive-electrode active materials that are commonly used for commercially available lithium ion secondary batteries at present, and thus have no actual results concerning the long-term stability. Patent Literature 12 describes that oxide positive-electrode active materials coated with specific ion conductors or carbons are less likely to be reduced, but the data shown in its examples only indicates the reduction action during charge, and thus it does not necessarily describe the effects when charge and discharge are repeated.

Non Patent Literature 4 mentions that the reduction of $LiCoO_2$ by $LiBH_4$ occurs during charge, and FIG. 1 of Non Patent Literature 4 clearly shows that the battery resistance increases by repeating charge/discharge cycles. It can be said from this that there is a demand for effective means capable of not only suppressing the reduction of the positive-electrode active material due to the complex hydride in the short term, but also suppressing the increase in the battery resistance after repetition of charge and discharge.

Meanwhile, in the case of using sulfur as an active material, it has an exceptionally high theoretical capacity of 10 times or more, though having a low operating voltage of 1.5 to 2.0 V (with reference to Li electrode), as compared with $LiCoO_2$ (4.2 V with reference to Li electrode) that is a positive-electrode active material commonly used for lithium ion batteries at present. Therefore, development aiming to produce high capacity batteries using various sulfur compounds has been proceeding. However, when a sulfur-based electrode active material is used in the liquid electrolyte system, polysulfide is dissolved in the liquid electrolyte, and therefore there is a problem of a decrease in coulomb efficiency (discharge capacity/charge capacity) when charge and discharge are repeated (Non Patent Literature 5). In order to solve this problem, a technique using a solid-state battery has been devised, and application of sulfur-based electrode active materials to solid-state batteries has been expected.

Electrode materials also have the following problems. That is, the mainstream of currently used lithium ion secondary batteries is to use scarce resources called rare metals such as cobalt and nickel as electrode materials, and therefore there is a demand for electrode materials with higher availability and lower cost.

As a low-cost and abundant material, sulfur is exemplified. When sulfur is used as an electrode active material, it has an exceptionally high theoretical capacity of 10 times or more, though having a low operating voltage of 1.5 to 2.5 V (with reference to lithium electrode), as compared with $LiCoO_2$ (4.2 V with reference to Li electrode) that is a positive-electrode active material commonly used for lithium ion secondary batteries at present. Therefore, attempts to produce high capacity batteries using various sulfur compounds as electrode active materials have been made.

Being different from $LiCoO_2$ that is a common positive-electrode active material for lithium ion secondary batteries, sulfur-based electrode active materials do not contain lithium. Therefore, in order to operate them as batteries, an active material containing lithium (for example, metal lithium and lithium alloys such as Li—In alloy) is generally used in a negative electrode. However, since metal lithium has exceptionally high reactivity and thus is dangerous, it is not easy to cause a large amount of sulfur-based electrode active material to react with metal lithium. Also in the case of using a Li—In alloy, the alloy needs to be produced using metal lithium, and thus metal lithium must be used after all.

At present, negative-electrode active materials used in common lithium ion secondary batteries are carbon-based materials, which do not contain lithium. Further, a Si-containing material has been proposed as a negative-electrode active material that can allow batteries with higher capacity to be achieved, which also does not contain lithium. In the case where a battery is configured using such a material free of lithium as a negative-electrode active material and a sulfur-based electrode active material as a positive-electrode active material, insertion of lithium (that is, lithium doping) into either the positive electrode or the negative electrode in advance is needed (Patent Literatures 14 to 16).

Lithium doping is performed, for example, in lithium ion capacitors (Patent Literatures 17 and 18). Further, a lithium doping method aiming to decrease the irreversible capacity is disclosed for lithium ion secondary batteries (Patent Literature 19). These techniques are field doping methods for electrochemically doping with lithium, which have a problem of the need for replacement of electrodes, or the need for insertion of a mean for doping into battery cells. Further, methods using a liquid electrolyte are unsuitable as methods for doping electrodes of solid-state batteries.

A technique of reacting an active material with metal lithium in advance before electrodes are produced is also disclosed (Patent Literatures 20 to 23). However, this method requires use of metal lithium with exceptionally high reactivity, and is unsuitable for mass production in view of both maintenance of quality of metal lithium suitable for doping and safety.

Further, all these methods aim to compensate for the irreversible capacity, and are unsuitable for doping in an amount equivalent to the theoretical capacity in which lithium can be inserted into an active material. This is because excess lithium remains as metal lithium, which can possibly result in generation of dendrite. Further, it is highly possible that doping with a large amount of metal lithium causes voids to be generated in portions where metal lithium was originally present. In the case of batteries using a liquid electrolyte, the lithium ion conductivity can be ensured by the liquid electrolyte filling the voids that have been generated, whereas in the case of batteries using a solid electrolyte, an increase of voids causes a decrease in lithium ion conductivity.

As a technique without using metal lithium, a method of doping a silicon-silicon oxide composite with lithium using lithium hydride or lithium aluminum hydride is disclosed (Patent Literature 24). However, this method also aims to compensate for the irreversible capacity, and it is described that the existence of unreacted lithium hydride or lithium aluminum hydride causes unfavorable effects on the battery properties.

Therefore, there is a demand for a lithium doping method that enables safer and more convenient doping and further is applicable to solid-state batteries.

CITATION LIST

Patent Literature

Patent Literature 1: Japanese Patent Laid-Open No. 2000-223156
Patent Literature 2: International Publication No. WO 2011/118801
Patent Literature 3: Japanese Patent Laid-Open No. 2012-43646
Patent Literature 4: Japanese Patent Laid-Open No. 2006-277997
Patent Literature 5: Japanese Patent Laid-Open No. 2011-150942
Patent Literature 6: Japanese Patent No. 3149524
Patent Literature 7: Japanese Patent No. 3163741
Patent Literature 8: Japanese Patent No. 3343934
Patent Literature 9: Japanese Patent No. 4165536
Patent Literature 10: Japanese Patent Laid-Open No. 2003-68361
Patent Literature 11: Japanese Patent No. 5187703
Patent Literature 12: Japanese Patent Laid-Open No. 2012-209106

Patent Literature 13: Japanese Patent Laid-Open No. 2012-209104
Patent Literature 14: International Publication No. WO 2010/44437
Patent Literature 15: Japanese Patent Laid-Open No. 2012-150934
Patent Literature 16: Japanese Patent Laid-Open No. 2008-147015
Patent Literature 17: Japanese Patent Laid-Open No. 2011-249517
Patent Literature 18: Japanese Patent Laid-Open No. 2011-249507
Patent Literature 19: Japanese Patent No. 4779985
Patent Literature 20: Japanese Patent Laid-Open No. 2012-204306
Patent Literature 21: Japanese Patent Laid-Open No. 2012-204310
Patent Literature 22: Japanese Patent Laid-Open No. 2012-209195
Patent Literature 23: Japanese Patent Laid-Open No. 2012-38686
Patent Literature 24: Japanese Patent Laid-Open No. 2011-222153

Non Patent Literature

Non Patent Literature 1: SEI Technical Review, September 2005, vol. 167, p. 54-60
Non Patent Literature 2: Applied Physics Letters (2007) 91, p. 224103
Non Patent Literature 3: JOURNAL OF THE AMERICAN CHEMICAL SOCIETY (2009), 131, p. 894-895
Non Patent Literature 4: Journal of Power Sources (2013), 226, p. 61-64 Non Patent Literature 5: Electrochemistry Communications, 31, pp. 71-75 (2013)

SUMMARY

Technical Problem

A first aspect of the present invention aims to provide a solid-state battery having high ion conductivity and excellent stability. Further, a second aspect of the present invention aims to provide a method of doping a sulfur-based electrode active material with lithium that enables safe and convenient lithium doping.

Solution to Problem

The first aspect of the present invention, for example, is as follows:
[1] A solid-state battery comprising: a positive-electrode layer; a negative-electrode layer; and a lithium-ion-conducting solid electrolyte layer disposed between the positive-electrode layer and the negative-electrode layer, wherein the positive-electrode layer contains a positive-electrode active material and a complex hydride solid electrolyte, the positive-electrode active material is a sulfur-based electrode active material, and the solid electrolyte layer contains a complex hydride solid electrolyte;
[1-2] The solid-state battery according to [1], wherein the complex hydride solid electrolyte contained in the positive-electrode layer is the same as the complex hydride solid electrolyte contained in the solid-electrolyte layer;
[2] The solid-state battery according to [1] or [1-2], wherein the sulfur-based electrode active material is an inorganic sulfur compound or a sulfur-polyacrylonitrile;
[3] The solid-state battery according to [2], wherein the inorganic sulfur compound is selected from the group consisting of S, S-carbon composite, $TiS_2$, $TiS_3$, $TiS_4$, NiS, $FeS_2$, and $MoS_2$;
[4] The solid-state battery according to any one of [1] to [3], wherein the complex hydride solid electrolyte is $LiBH_4$ or a combination of $LiBH_4$ and an alkali metal compound represented by Formula (1) below:

$$MX \quad (1),$$

wherein
M represents an alkali metal atom selected from the group consisting of a lithium atom, a rubidium atom, and a cesium atom, and X represents a halogen atom or an $NH_2$ group;
[4-1] The solid-state battery according to [4], wherein the complex hydride solid electrolyte has diffraction peaks at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: $\lambda=1.5405$ Å) at less than 115° C.;
[5] The solid-state battery according to [4] or [4-1], wherein the alkali metal compound is selected from the group consisting of a rubidium halide, a lithium halide, a cesium halide, and a lithium amide;
[5-1] The solid-state battery according to any one of [1] to [5], wherein the negative-electrode layer contains a negative-electrode active material selected from the group consisting of Li, carbon, and Si;
[5-2] The solid-state battery according to any one of [1] to [5-1], wherein the negative-electrode layer contains the same solid electrolyte as the complex hydride solid electrolyte contained in the solid-electrolyte layer;
[6] The solid-state battery according to any one of [1] to [5-2], wherein the positive-electrode layer is formed by pressing; and
[7] The solid-state battery according to [6], wherein the pressing is performed by applying a pressure of 114 to 500 MPa to a material of the positive-electrode layer.

The second aspect of the present invention, for example, is as follows:
[8] A method for manufacturing a sulfur-based electrode active material doped with lithium, comprising: doping a sulfur-based electrode active material with lithium by mixing the sulfur-based electrode active material with a material containing a lithium-containing complex hydride;
[9] The method for manufacturing a sulfur-based electrode active material doped with lithium according to [8], wherein the step of doping the sulfur-based electrode active material with lithium is performed by mixing the sulfur-based electrode active material with the material containing a lithium-containing complex hydride, followed by heating;
[10] The method for manufacturing a sulfur-based electrode active material doped with lithium according to [9], wherein the heating is performed at a temperature of 60° C. to 200° C.;
[10-1] The method for manufacturing a sulfur-based electrode active material doped with lithium according to any one of [8] to [10], wherein the mixing of the sulfur-based electrode active material with the material containing a lithium-containing complex hydride is performed under an inert gas atmosphere;
[10-2] The method for manufacturing a sulfur-based electrode active material doped with lithium according to any one of [8] to [10-1], wherein the mixing of the sulfur-based electrode active material with the material containing a lithium-containing complex hydride is performed by a dry process;

[11] The method for manufacturing a sulfur-based electrode active material doped with lithium according to any one of [8] to [10-2], wherein the sulfur-based electrode active material is selected from the group consisting of a sulfur-polyacrylonitrile, a disulfide compound, $TiS_2$, $TiS_3$, $TiS_4$, NiS, $NiS_2$, CuS, $FeS_2$, and $MoS_3$;

[12] The method for manufacturing a sulfur-based electrode active material doped with lithium according to any one of [8] to [11], wherein the material containing a lithium-containing complex hydride is a lithium-ion-conducting solid electrolyte;

[13] The method for manufacturing a sulfur-based electrode active material doped with lithium according to any one of [8] to [12], wherein the material containing a lithium-containing complex hydride is $LiBH_4$ or a combination of $LiBH_4$ and an alkali metal compound represented by Formula (1) below:

$$MX \qquad (1),$$

wherein
M represents an alkali metal atom selected from the group consisting of a lithium atom, a rubidium atom, and a cesium atom, and X represents a halogen atom or an $NH_2$ group;

[13-1] The method for manufacturing a sulfur-based electrode active material doped with lithium according to [13], wherein the material containing a lithium-containing complex hydride has diffraction peaks at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: $\lambda=1.5405$ Å) at less than 115° C.;

[14] The method for manufacturing a sulfur-based electrode active material doped with lithium according to [13] or [13-1], wherein the alkali metal compound is selected from the group consisting of a rubidium halide, a lithium halide, a cesium halide, and a lithium amide;

[15] An electrode comprising a sulfur-based electrode active material doped with lithium manufactured by the method according to any one of [8] to [14];

[16] A method for manufacturing an electrode, comprising: preparing a mixture of a sulfur-based electrode active material and a material containing a lithium-containing complex hydride; applying the mixture to a current collector; and doping the sulfur-based electrode active material with lithium by heating the mixture-applied current collector;

[16-1] The method for manufacturing an electrode according to [16], wherein the heating is performed at a temperature of 60° C. to 200° C.;

[16-2] The method for manufacturing an electrode according to [16] or [16-1], wherein the preparation of the mixture of the sulfur-based electrode active material and the material containing a lithium-containing complex hydride is performed under an inert gas atmosphere;

[16-3] The method for manufacturing an electrode according to any one of [16] to [16-2], wherein the preparation of the mixture of the sulfur-based electrode active material and the material containing a lithium-containing complex hydride is performed by a dry process;

[16-4] The method for manufacturing an electrode according to any one of [16] to [16-3], wherein the sulfur-based electrode active material is selected from the group consisting of a sulfur-polyacrylonitrile, a disulfide compound, $TiS_2$, $TiS_3$, $TiS_4$, NiS, $NiS_2$, CuS, $FeS_2$, and $MoS_3$;

[16-5] The method for manufacturing an electrode according to any one of [16] to [16-4], wherein the material containing a lithium-containing complex hydride is a lithium-ion-conducting solid electrolyte;

[16-6] The method for manufacturing an electrode according to any one of [16] to [16-5], wherein the material containing a lithium-containing complex hydride is $LiBH_4$ or a combination of $LiBH_4$ and an alkali metal compound represented by Formula (1) below:

$$MX \qquad (1),$$

wherein
M represents an alkali metal atom selected from the group consisting of a lithium atom, a rubidium atom, and a cesium atom, and X represents a halogen atom or an $NH_2$ group;

[16-7] The method for manufacturing an electrode according to [16-6], wherein the material containing a lithium-containing complex hydride has diffraction peaks at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: $\lambda=1.5405$ Å) at less than 115° C.;

[16-8] The method for manufacturing an electrode according to [16-6], wherein the alkali metal compound is selected from the group consisting of a rubidium halide, a lithium halide, a cesium halide, and a lithium amide;

[17] An electrode manufactured by the method according to any one of [16] to [16-8];

[18] A lithium ion secondary battery comprising the electrode according to [15] or [17];

[19] The lithium ion secondary battery according to [18], being a solid-state battery;

[20] The lithium ion secondary battery according to [18] or [19], wherein one electrode is the electrode according to [15] or [17], and another electrode is an electrode free of lithium; and

[21] A solid-state battery comprising: a positive-electrode layer; a negative-electrode layer; a lithium-ion-conducting solid electrolyte layer disposed between the positive-electrode layer and the negative-electrode layer, wherein the positive-electrode layer is the electrode according to [15] or [17], and the solid electrolyte layer contains a complex hydride solid electrolyte.

Advantageous Effects of Invention

The first aspect of the present invention can provide a solid-state battery having high ion conductivity and excellent stability. Further, the second aspect of the present invention can provide a method for manufacturing a sulfur-based electrode active material doped with lithium that enables safe and convenient lithium doping. Further, the method according to the second aspect of the present invention can be applied also to solid-state batteries.

BRIEF DESCRIPTION OF DRAWINGS

FIG. 1 is a sectional view of a solid-state battery according to the first aspect of the present invention.

FIG. 2 is an SEM image showing a cross section of a positive-electrode layer in a solid-state battery produced in Example A1.

FIG. 3A is a graph showing the transition in discharge capacity of the solid-state battery produced in Example A1.

FIG. 3B is a graph showing the transition in discharge capacity of a solid-state battery produced in Example A6.

FIG. 3C is a graph showing the transition in discharge capacity of a solid-state battery produced in Example A7.

FIG. 3D is a graph showing the transition in discharge capacity of a solid-state battery produced in Example A8.

FIG. 3E is a graph showing the transition in discharge capacity of a solid-state battery produced in Example A9.

FIG. 3F is a graph showing the transition in discharge capacity of a solid-state battery produced in Example A10.

FIG. 4A is a graph showing charge-discharge curves of the solid-state battery produced in Example A1, at the 1st, 2nd, and 45th cycles.

FIG. 4B is a graph showing charge-discharge curves of the solid-state battery produced in Example A6, at the 2nd, 3rd, and 45th cycles.

FIG. 4C is a graph showing charge-discharge curves of the solid-state battery produced in Example A7, at the 2nd, 3rd, and 20th cycles.

FIG. 5 is a graph showing the results of thermal desorption mass spectroscopy for a mixture of $TiS_2$ and $LiBH_4$.

FIG. 6A is a graph showing the results of X-ray diffraction measurement for powders obtained in Example B1.

FIG. 6B is a graph showing the results of X-ray diffraction measurement for powders obtained in Example B2.

FIG. 6C is a graph showing the results of X-ray diffraction measurement for powders obtained in Example B3.

FIG. 7 is a graph showing the relationship of lithium content to a- and c-axis lattice constants.

FIG. 8 is a graph showing the transition in discharge capacity of a solid-state battery produced in Example B4.

FIG. 9 is a graph showing charge-discharge curves of the solid-state battery produced in Example B4, at the 1st, 2nd, and 20th cycles.

DESCRIPTION OF EMBODIMENTS

Hereinafter, embodiments of the present invention will be described with reference to the drawings. It should be noted that components having the same or a similar function in the drawings are represented by the same reference numeral, and the overlapping description will be omitted. Further, the present invention is not limited to materials, configurations, or the like, described below, and various modifications can be made within the range of the gist of the present invention.

[First Aspect]

FIG. 1 is a sectional view of the solid-state battery according to the first aspect of the present invention.

A solid-state battery 10 is, for example, a solid-state lithium ion secondary battery, and can be used in various devices including mobile phones, personal computers, automobiles, and the like. The solid-state battery 10 has a structure in which a solid electrolyte layer 2 is disposed between a positive-electrode layer 1 and a negative-electrode layer 3. In the present invention, the positive-electrode layer 1 contains a positive-electrode active material and a complex hydride solid electrolyte, and the positive-electrode active material is a sulfur-based electrode active material. Further, the solid electrolyte layer 2 contains a complex hydride solid electrolyte. Such a configuration enables suppression of an increase in battery resistance when the battery is operated. This effect is obtained also when charge/discharge cycles are repeated, and therefore it is possible to provide a solid-state battery that stably operates over a long period of time, while using a complex hydride solid electrolyte with high ion conductivity.

As mentioned above, in the case of using a complex hydride as a solid electrolyte, the reduction of the positive-electrode active material is concerned. The reason why the aforementioned effect can be obtained under such a situation is not clear, but the state is thought to be less likely to lead to an increase in battery resistance and a decrease in battery capacity, even if the positive-electrode active material reacts with the complex hydride solid electrolyte. As a result, even if the complex hydride solid electrolyte is in contact with the positive-electrode active material, the complex hydride with high lithium ion conductivity can be used as the solid electrolyte without concerning the reduction of the positive-electrode active material by the complex hydride. Further, it can be estimated that an increase in battery resistance is suppressed as described above, as a result of which a solid-state battery that stably operates over a long period of time, even if charge/discharge cycles are repeated, can be provided.

Hereinafter, each member will be described in detail.

1. Positive-Electrode Layer

The positive-electrode layer 1 contains a sulfur-based electrode active material as a positive-electrode active material and a complex hydride solid electrolyte. The positive-electrode layer 1 may further optionally contain a conductive additive, a binder, or the like.

Any material can be used as the sulfur-based electrode active material as long as it is capable of releasing lithium ions during charge and absorbing lithium ions during discharge. Particles or a thin film of an organic sulfur compound or an inorganic sulfur compound can be used therefor, both of which perform charge and discharge using the oxidation-reduction reaction of sulfur.

Examples of the organic sulfur compound include a disulfide compound, a sulfur-polyacrylonitrile typified by a compound according to WO 2010-044437, a sulfur-polyisoprene, rubeanic acid (dithiooxamide), and polysulfide carbon. Above all, a disulfide compound, a sulfur-polyacrylonitrile, and rubeanic acid are preferable, and a sulfur-polyacrylonitrile is particularly preferable. As a disulfide compound, a dithiobiurea derivative, and a disulfide compound having a thiourea group, thioisocyanate, or a thioamide group are more preferable.

The sulfur-polyacrylonitrile is modified polyacrylonitrile containing sulfur atoms, which is obtained by mixing sulfur powder with polyacrylonitrile and heating the mixture under inert gas or reduced pressure. The estimated structure thereof is, for example, a structure in which polyacrylonitrile undergoes ring closure to be polycyclic, and at least a part of S binds to C, as shown in Chem. Mater. 2011, 23, 5024-5028. The compound described in this literature has strong peak signals around 1330 $cm^{-1}$ and 1560 $cm^{-1}$, and further has peaks around 307 $cm^{-1}$, 379 $cm^{-1}$, 472 $cm^{-1}$, and 929 $cm^{-1}$ in the Raman spectrum.

Here, a method for preparing the sulfur-polyacrylonitrile will be described.

Sulfur as a raw material is not specifically limited, but any of α-sulfur, β-sulfur, and γ-sulfur each having an $S_8$ structure can be used therefor. When the particle size of sulfur is excessively large, the mixability decreases, and when it is excessively small, sulfur is in the form of nanoparticles, which are difficult to handle. Therefore, the particle size is preferably in the range of 1 to 300 μm, more preferably 10 to 200 μm, as observed by an electron microscope.

Polyacrylonitrile is not specifically limited, but its weight-average molecular weight is preferably in the range of 10,000 to 300,000. The particle size of polyacrylonitrile is preferably in the range of 0.1 to 100 μm, particularly preferably 1 to 50 μm.

The method for mixing sulfur with polyacrylonitrile is not specifically limited, but examples thereof include methods using a grinder, a ball mill, a planetary ball mill, a bead mill, a revolving mixer, a high-speed stirring mixing device, and a tumbler mixer. However, if a method in which large energy is given at the time of mixing, as typified by mixing using a planetary ball mill, is used, not only mixing but also reaction may possibly proceed simultaneously. Accordingly, a grinder or a tumbler mixer capable of mild mixing is preferably used. In the case of small-scale implementation, mortar mixing by hand is preferable. The mixing is preferably performed by a dry process, but also can be performed in the presence of a solvent. In the case of using a solvent, a solvent having a boiling point of 210° C. or lower is preferably used so that the solvent is volatilized and removed before sulfur reacts with polyacrylonitrile.

The mixing ratio of sulfur powder to polyacrylonitrile as raw materials is not specifically limited, but is preferably in the range of sulfur:polyacrylonitrile=0.3:1 to 10:1, more preferably 1:1 to 5:1, in a weight ratio.

The heating after the mixing can be performed under reduced pressure or inert gas. In the case of the heating under reduced pressure, it is preferably performed at a pressure in the range of 10 Pa to 70 kPa. In the case of the heating under inert gas, it is preferably performed at a pressure in the range of 0.1 kPa to 1 MPa, more preferably in the range of 1 kPa to 150 kPa. Examples of the inert gas can include helium, nitrogen, and argon. It should be noted that, in the case of the heating under inert gas, the inert gas is preferably circulated. This is because the reaction proceeds well by removing hydrogen sulfide gas to be generated. In the case of the heating under reduced pressure, the reactor is preferably replaced with the inert gas before the heating. This is because an oxidation reaction that is a side reaction proceeds if oxygen remains. However, it does not apply to the case where the degree of vacuum is high, and oxygen can be almost removed from the system.

The heating temperature is preferably in the range of 200 to 500° C., more preferably in the range of 250 to 450° C. When the temperature is higher than this range, the volatilization of sulfur is enhanced, and therefore a greater amount of sulfur as a raw material is needed. When the temperature is low, the reaction proceeds slowly, which is not efficient.

The heating time is not specifically limited, but the aforementioned temperature may be maintained, for example, for 1 to 12 hours. When the heating temperature is low, it takes time to obtain a sulfur-polyacrylonitrile, and when the heating temperature is high, the sulfur-polyacrylonitrile can be obtained within a short time. The temperature and time can be adjusted depending on the devices to be used or the scale.

The inorganic sulfur compound is preferable because of its excellent stability, and specific examples thereof include sulfur (S), S-carbon composite, $TiS_2$, $TiS_3$, $TiS_4$, NiS, $NiS_2$, CuS, $FeS_2$, $Li_2S$, $MoS_2$, and $MoS_3$. Above all, S, S-carbon composite, $TiS_2$, $TiS_3$, $TiS_4$, $FeS_2$, and $MoS_2$ are preferable, and S-carbon composite, $TiS_2$, and $FeS_2$ are more preferable.

The S-carbon composite contains sulfur powder and a carbon material, and is formed by heating or mechanically mixing them into a composite state. More specifically, it is in a state where the sulfur is distributed on surfaces or in pores of the carbon material, in a state where the sulfur and the carbon material are uniformly dispersed at the nano level and are aggregated to form particles, in a state where the carbon material is distributed on surfaces of or inside the fine sulfur powder, or in a state where a plurality of these states are combined.

Here, a method for preparing the S-carbon composite will be described.

Sulfur as a raw material is not specifically limited, but any of α-sulfur, β-sulfur, and γ-sulfur each having an $S_8$ structure can be used therefor. When the particle size of sulfur is excessively large, the mixability decreases, and when it is excessively small, sulfur is in the form of nanoparticles, which are difficult to handle. Therefore, the particle size is preferably in the range of 1 to 300 µm, more preferably 10 to 200 µM.

The carbon material is not specifically limited, but examples thereof include carbon black, acetylene black, Ketjen black, Maxsorb®, carbon fiber, and graphene. Further, these can be used in combination. In the case of using Maxsorb® and Ketjen black in combination, the plateau region during charge and discharge expands, and the charge/discharge capacity retention rate is high, even after cycles are repeated, which is more preferable.

The ratio of sulfur to the carbon material is preferably in the range of sulfur:carbon material=0.1:1 to 10:1, more preferably 0.5:1 to 3:1, in a weight ratio. When the amount of sulfur is large, an active material having high charge-discharge capacity per unit weight can be obtained, which is therefore preferable. When the amount of the carbon material is excessively small, the electron conductivity decreases, and thus operation as a battery is rendered difficult. Therefore, the ratio of sulfur to the carbon material is important. It should be noted that, in almost all preparation methods, the ratio of sulfur to the carbon material as raw materials conforms with the ratio of sulfur to the carbon material in the S-carbon composite as a product.

The preparation method is also not specifically limited, and examples thereof include a method of mixing sulfur with the carbon material, followed by heating to the melting point of sulfur or higher, a method using mechanochemical, and a high-speed airflow impact method.

The method using mechanochemical is a method of causing powerful milling, mixing, and reaction by applying mechanical energy to a plurality of different materials. For example, the method is performed using a ball mill, a bead mill, or a planetary ball mill, in which a solvent also can be used. The high-speed airflow impact method is a method suitable for the case where preparation in a larger amount is intended, which is performed, for example, using a jet mill. As in these methods, in the case of using a method having high milling performance and being capable of very fine milling of particles, sulfur and the carbon material are uniformly distributed at the nano-level. When an S-carbon composite obtained from particles formed by aggregation of them is used as an active material, the charge/discharge capacity retention rate is improved, which is therefore more preferable.

Further, a method of generating sulfur from thiosulfate such as $Na_2S_2O_3$ and inserting the sulfur into the internal space of a carbon material is disclosed (Japanese Patent Laid-Open No. 2012-204332), and an S-carbon composite prepared using the aforementioned method also can be used.

The positive-electrode layer 1 is of bulk type, containing both the sulfur-based electrode active material and the complex hydride solid electrolyte. A battery can be operated by forming the positive-electrode layer into a thin film with a thickness of 1 to 10 µm, even if the positive-electrode layer does not contain a solid electrolyte, in which, however, the amount of active material to be contained per cell decreases. Therefore, the aforementioned configuration is not preferable as a configuration of a battery aiming to ensure the capacity.

As the complex hydride solid electrolyte, the same material as that described in "2. Solid-electrolyte layer" below can be used. In particular, it is preferable that the same complex hydride solid electrolyte be contained in the positive-electrode layer 1 and the solid electrolyte layer 2. This is because, if layers containing solid electrolytes with different compositions are in contact with each other, it is highly possible that constituent elements of the solid electrolytes diffuse in the respective layers, which may result in a decrease in lithium ion conductivity.

As a result of repetition of tests by the present inventors, it has turned out that a solid-state battery with high positive electrode utilization (the ratio of the discharge capacity with respect to the theoretical capacity) and low interfacial resistance can be obtained, in the case where a positive-electrode layer of bulk type is formed using a sulfur-based electrode active material together with a solid electrolyte. The sulfur-based electrode active material is softer than oxide electrode active materials that are commonly used in lithium ion secondary batteries. Therefore, it is considered that the sulfur-based electrode active material is crushed together with the solid electrolyte during formation of the positive-electrode layer, so that a good interface is formed between the positive-electrode active material and the solid electrolyte, thereby leading to the aforementioned effect. In particular, the positive-electrode layer 1 is preferably produced by pressing by applying a pressure of 50 to 800 MPa, more preferably 114 to 500 MPa, to the aforementioned material of the positive-electrode layer, in view of the aforementioned effect. That is, a layer having good adhesion and fewer voids between particles can be obtained by pressing at a pressure in the aforementioned range.

The ratio of the positive-electrode active material to the solid electrolyte in the positive-electrode layer 1 is favorably higher within the range in which the shape of the positive electrode can be maintained, and necessary ion conductivity can be ensured. For example, the ratio is preferably in the range of positive-electrode active material:solid electrolyte=9:1 to 1:9, more preferably 8:2 to 2:8, in a weight ratio.

The conductive additive to be used for the positive-electrode layer 1 is not specifically limited as long as it has a desired conductivity, but examples thereof can include a conductive additive made of a carbon material. Specific examples thereof include carbon black, acetylene black, Ketjen black, and carbon fibers.

The content of the conductive additive in the positive-electrode layer 1 is preferably lower within the range that allows a desired electron conductivity to be ensured. The content of the conductive additive with respect to the positive-electrode layer forming materials is, for example, 0.1 mass % to 40 mass %, preferably 3 mass % to 30 mass %.

As the binder to be used for the positive-electrode layer 1, binders commonly used for positive-electrode layers of lithium ion secondary batteries can be used. For example, polysiloxane, polyalkylene glycol, polyvinylidene fluoride (PVdF), polytetrafluoroethylene (PTFE), and ethylene-vinyl alcohol copolymer (EVOH) can be used. A thickener such as carboxymethylcellulose (CMC) also can be used, as needed.

The thickness of the positive-electrode layer 1 is not specifically limited as long as the function as a positive-electrode layer is exerted, but is preferably 1 μm to 1000 μm, more preferably 10 μm to 200 μm.

2. Solid-Electrolyte Layer

The solid electrolyte layer 2 is a lithium-ion-conducting layer disposed between the positive-electrode layer 1 and the negative-electrode layer 3, and contains a complex hydride solid electrolyte.

The complex hydride solid electrolyte is not specifically limited as long as it is a material containing a lithium-ion-conducting complex hydride. For example, the complex hydride solid electrolyte is $LiBH_4$ or a combination of $LiBH_4$ and an alkali metal compound represented by Formula (1) below:

$$MX \qquad (1),$$

wherein

M represents an alkali metal atom selected from the group consisting of a lithium atom, a rubidium atom, and a cesium atom, and X represents a halogen atom or an $NH_2$ group.

The halogen atom serving as X in Formula (1) above, for example, may be an iodine atom, a bromine atom, a fluorine atom, or a chlorine atom. X is preferably an iodine atom, a bromine atom, or an $NH_2$ group, more preferably an iodine atom or an $NH_2$ group.

Specifically, the alkali metal compound is preferably a lithium halide (for example, LiI, LiBr, LiF, or LiCl), a rubidium halide (for example, RbI, RbBr, RbF, or RbCl), a cesium halide (for example, CsI, CsBr, CsF, or CsCl), or a lithium amide ($LiNH_2$), more preferably LiI, RbI, CsI, or $LiNH_2$. As the alkali metal compound, one of these may be used singly, or two or more of these may be used in combination. Preferable combinations include the combination of LiI and RbI.

Known compounds can be used respectively as $LiBH_4$ and the alkali metal compound. Further, the purity of these compounds is preferably 80% or more, more preferably 90% or more. This is because compounds having a purity within the aforementioned range have high performance as a solid electrolyte.

The molar ratio of $LiBH_4$ to the alkali metal compound is preferably 1:1 to 20:1, more preferably 2:1 to 7:1. When the molar ratio falls within the aforementioned range, the amount of $LiBH_4$ in the solid electrolyte can be sufficiently ensured, and high ion conductivity can be obtained. On the other hand, when the amount of $LiBH_4$ is excessively large, the transition temperature of the high temperature phase (high ion conducting phase) is less likely to decrease, and thus there is a tendency that sufficient ion conductivity cannot be obtained at a temperature lower than the transition temperature of the high temperature phase of $LiBH_4$ (115° C.).

In the case of using two or more types of alkali metal compounds in combination, the mixing ratio thereof is not specifically limited. For example, in the case of using LiI and another alkali metal compound (preferably RbI or CsI) in combination, the molar ratio of LiI to the other alkali metal compound is preferably 1:1 to 20:1, more preferably 5:1 to 20:1. When the molar ratio falls within the aforementioned range, the amount of LiI in the solid electrolyte can be sufficiently ensured, and a solid electrolyte layer having good thermostability can be obtained. On the other hand, when the amount of LiI is excessively large, there is a tendency that the effect of adding the other alkali metal compound cannot be sufficiently obtained, as a result of which sufficient ion conductivity cannot be obtained.

The complex hydride solid electrolyte preferably has diffraction peaks at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: $\lambda=1.5405$ Å) at less than 115° C. It has diffraction peaks more preferably at at least $2\theta=23.7\pm0.7$ deg, $25.2\pm0.8$ deg, $26.9\pm0.8$ deg, $35.0\pm1.0$ deg, and $41.3\pm1.0$ deg, further preferably at at least $2\theta=23.6\pm0.5$ deg, $24.9\pm0.5$ deg, $26.7\pm0.5$ deg, $34.6\pm0.5$ deg, and $40.9\pm0.5$ deg. Further, it has diffraction peaks particularly preferably at at least $2\theta=23.6\pm0.3$ deg, $24.9\pm0.3$ deg, $26.7\pm0.3$ deg, $34.6\pm0.3$ deg, and $40.9\pm0.3$ deg. These diffraction peaks in the five regions correspond to the diffraction peaks of the high temperature phase of $LiBH_4$. The solid electrolyte having diffraction peaks in the five regions, as described above, even at a temperature lower than the transition temperature of the high temperature phase of $LiBH_4$ tends to exhibit high ion conductivity even at a temperature lower than the aforementioned transition temperature.

The method for preparing the complex hydride solid electrolyte is not specifically limited, but preparation, for example, by mechanical milling or melt mixing according to Japanese Patent No. 5187703 is preferable. The solid electrolyte layer 2 may contain materials other than above, as needed. For example, the solid electrolyte layer 2 that is formed into a sheet using a binder also can be used.

The thickness of the solid electrolyte layer 2 is preferably smaller. Specifically, the thickness is preferably in the range of 0.05 to 1000 μm, more preferably in the range of 0.1 μm to 200 μm.

3. Negative-Electrode Layer

The negative-electrode layer 3 is a layer containing at least a negative-electrode active material, and may optionally contain a solid electrolyte, a conductive additive, a binder, and the like.

As the negative-electrode active material, a metal active material and a carbon active material, for example, can be used. Examples of the aforementioned metal active material include Li, In, Al, Si, and Sn, and alloys of these metals. Meanwhile, examples of the aforementioned carbon active material include mesocarbon microbead (MCMB), highly oriented pyrolytic graphite (HOPG), hard carbon, and soft carbon. In particular, use of an active material having a lower electrode potential as a negative electrode improves the battery energy density and enhances the operating voltage, which is therefore preferable. Examples of such a negative-electrode active material include Li, In—Li alloy, a carbon active material, and Si. It should be noted that, in the case of using a metal lithium foil as a negative electrode, the solid-state battery is preferably heated in advance (for example, at 120° C. for about 2 hours). The adhesion between the solid electrolyte layer and the metal lithium is enhanced by heating, so that charge and discharge can be performed more stably.

The solid electrolyte to be used for the negative-electrode layer 3 is not specifically limited as long as it has lithium ion conductivity and is stable with the negative-electrode active material, but a complex hydride solid electrolyte, for example, can be used. The complex hydride solid electrolyte is comparatively soft, and therefore can form a good interface with the negative-electrode active material such as graphite. The negative-electrode layer 3 is preferably of bulk type containing both the negative-electrode active material and the solid electrolyte. As the complex hydride solid electrolyte to be contained in the negative-electrode layer 3, the complex hydride solid electrolyte described above for the solid electrolyte layer 2 can be used. In particular, it is preferable that the same complex hydride solid electrolyte be contained in the negative-electrode layer 3 and the solid electrolyte layer 2. This is because, if layers containing solid electrolytes with different compositions are in contact with each other, it is highly possible that constituent elements of the solid electrolytes diffuse in the respective layers, which may result in a decrease in lithium ion conductivity.

The ratio of the negative-electrode active material to the solid electrolyte is favorably higher within the range in which the shape of the negative electrode can be maintained, and necessary ion conductivity can be ensured. For example, the ratio is preferably in the range of negative-electrode active material:solid electrolyte=9:1 to 1:9, more preferably 8:2 to 2:8, in a weight ratio.

As the conductive additive to be used for the negative-electrode layer 3, the same conductive additive as that in the positive-electrode layer 1 can be used. The content of the conductive additive with respect to the negative-electrode layer forming materials is, for example, 0.1 mass % to 20 mass %, preferably 3 mass % to 15 mass %.

As the binder to be used for the negative-electrode layer 3, binders commonly used for negative-electrode layers of lithium secondary batteries can be used. Examples thereof include polysiloxane, polyalkylene glycol, polyvinylidene fluoride (PVdF), polytetrafluoroethylene (PTFE), styrene-butadiene rubber (SBR), and polyacrylic acid. A thickener such as carboxymethylcellulose (CMC) also can be used, as needed.

The thickness of the negative-electrode layer 3 is not limited as long as the function as a negative-electrode layer is exerted, but is preferably 0.05 μm to 1000 μm, more preferably 0.1 μm to 200 μm.

(Method for Manufacturing Solid-State Battery)

Subsequently, a method for manufacturing the above described solid-state battery will be described.

The solid-state battery is manufactured by forming the aforementioned layers and laminating them, but the formation method and the lamination method of the layers are not specifically limited. Examples thereof include: a method for forming a film by forming a slurry by dispersing a solid electrolyte or an electrode active material in a solvent and applying the slurry by doctor blading, spin coating, or the like, followed by rolling; a vapor phase method in which film forming and lamination are performed by vacuum evaporation, ion plating, sputtering, laser ablation, or the like; and a pressing method in which powder is formed and laminated by hot pressing or cold pressing without heating. Since the complex hydride solid electrolyte is soft, it is particularly preferable that a battery be produced by forming and laminating the layers by pressing. Examples of the pressing method include hot pressing that is performed by heating and cold pressing that is performed without heating, but cold pressing is more preferable because the complex hydride has sufficiently good formability without heating. It is preferable that the layers be integrally formed by pressing at a pressure of preferably 50 to 800 MPa, more preferably 114 to 500 MPa. A layer having good adhesion and fewer voids between particles can be obtained by pressing at a pressure in the aforementioned range, which is therefore preferable in view of the ion conductivity. Increasing the pressure more than necessary is not practical because it requires use of a pressing apparatus and a forming container made of expensive materials, and their useful life is shortened.

[Second Aspect]

In the method described below, a step of doping with lithium may be performed during manufacture of the sulfur-based electrode active material, may be performed during production of the electrode, or may be performed during production of the battery. Hereinafter, each aspect will be described in detail.

1. Manufacture of Sulfur-Based Electrode Active Material Doped with Lithium

A method for manufacturing a sulfur-based electrode active material doped with lithium according to an embodiment of the present invention includes a step of doping a sulfur-based electrode active material with lithium by mixing the sulfur-based electrode active material with a material containing a lithium-containing complex hydride. In this description, "doping" or "to dope" means a phenomenon expressed in various terms such as intercalation, insertion, absorption, and carrying, and "lithium doping" or "doping with lithium" means that a lithium sulfur compound is formed as a result of the aforementioned phenomenon.

According to the embodiment of the present invention, doping with lithium can be performed conveniently without using electrochemical techniques, where it is safe since there is no need to use metal lithium. It is also advantageous in that the sulfur-based electrode active material is uniformly doped with lithium. Further, the embodiment of the present invention enables doping with the entire amount of lithium that is necessary for electrode reactions. Furthermore, since the material containing the lithium-containing complex hydride that is a doping agent serves as a lithium ion conductor, adverse effects on the battery due to remaining excess doping agent are exceptionally decreased.

The method of the present invention, for example, can be used for electrode active materials for lithium ion secondary batteries using a non-aqueous liquid electrolyte and electrode active materials for solid-state lithium ion secondary batteries. The sulfur-based electrode active material doped with lithium is preferably used as a positive electrode, but also can be used as a negative-electrode active material by being combined with an active material (such as $FePO_4$, $FeF_3$, and $VF_3$) having higher electrode potential than the sulfur-based electrode active material.

Hereinafter, each material will be described in detail.

(1) Sulfur-Based Electrode Active Material

Any sulfur compound can be used as the sulfur-based electrode active material as long as it is capable of releasing lithium ions during charge and absorbing lithium ions during discharge. An organic sulfur compound or an inorganic sulfur compound can be used therefor, and these compounds may be subjected to a treatment such as carbon coating and complexing with carbon for imparting electron conductivity.

Examples of the organic sulfur compound include a disulfide compound, a sulfur-polyacrylonitrile typified by a compound according to International Publication No. WO 2010-044437, a sulfur-polyisoprene, and polysulfide carbon. Above all, a disulfide compound and a sulfur-polyacrylonitrile are preferable, and a disulfide compound having a dithiobiurea derivative, a thiourea group, thioisocyanate, or a thioamide group is more preferable.

The sulfur-polyacrylonitrile is a modified polyacrylonitrile containing sulfur atoms, which is obtained by mixing sulfur powder with polyacrylonitrile and heating it under inert gas or reduced pressure. The estimated structure thereof is a structure in which polyacrylonitrile undergoes ring closure to be polycyclic, and at least part of S binds to C, as disclosed, for example, in Chem. Mater. 2011, 23, 5024-5028. The compound described in this literature has strong peak signals around 1330 $cm^{-1}$ and 1560 $cm^{-1}$, and further has peaks around 307 $cm^{-1}$, 379 $cm^{-1}$, 472 $cm^{-1}$, and 929 $cm^{-1}$ in the Raman spectrum.

Here, a method for preparing a sulfur-polyacrylonitrile will be described.

Sulfur as a raw material is not specifically limited, but any of α-sulfur, β-sulfur, and γ-sulfur each having an $S_8$ structure can be used therefor. When the particle size of sulfur is excessively large, the mixability decreases, and when it is excessively small, sulfur is in the form of nanoparticles, which are difficult to handle. Therefore, the particle size is preferably in the range of 1 to 300 μm, more preferably 10 to 200 μm, as observed by an electron microscope.

Polyacrylonitrile is not specifically limited, but its weight-average molecular weight is preferably in the range of 10,000 to 300,000. The particle size of polyacrylonitrile is preferably in the range of 0.1 to 100 μm, particularly preferably 1 to 50 μm.

The method for mixing sulfur with polyacrylonitrile is not specifically limited, but examples thereof include methods using a grinder, a ball mill, a planetary ball mill, a bead mill, a revolving mixer, a high-speed stirring mixing device, and a tumbler mixer. However, if a method in which large energy is given at the time of mixing, as typified by mixing using a planetary ball mill, is used, not only mixing but also reaction may possibly proceed simultaneously. Accordingly, a grinder or a tumbler mixer capable of mild mixing is preferably used. In the case of small-scale implementation, mortar mixing by hand is preferable. The mixing is preferably performed by a dry process, but also can be performed in the presence of a solvent. In the case of using a solvent, a solvent having a boiling point of 210° C. or lower is preferably used so that the solvent is volatilized and removed before sulfur reacts with polyacrylonitrile.

The mixing ratio of sulfur powder to polyacrylonitrile as raw materials is not specifically limited, but is preferably in the range of sulfur:polyacrylonitrile=0.3:1 to 10:1, more preferably 1:1 to 5:1, in a weight ratio.

The heating after the mixing can be performed under reduced pressure or inert gas. In the case of the heating under reduced pressure, it is preferably performed at a pressure in the range of 10 Pa to 70 kPa. In the case of the heating under inert gas, it is preferably performed at a pressure in the range of 0.1 kPa to 1 MPa, more preferably in the range of 1 kPa to 150 kPa. Examples of the inert gas can include helium, nitrogen, and argon. It should be noted that, in the case of the heating under inert gas, the inert gas is preferably circulated. This is because the reaction proceeds well by removing hydrogen sulfide gas to be generated. In the case of the heating under reduced pressure, the reactor is preferably replaced with the inert gas before the heating. This is because an oxidation reaction that is a side reaction proceeds if oxygen remains. However, it does not apply to the case where the degree of vacuum is high, and oxygen can be almost removed from the system.

The heating temperature is preferably in the range of 200 to 500° C., more preferably in the range of 250 to 450° C. When the temperature is higher than this range, the volatilization of sulfur is enhanced, and therefore a greater amount of sulfur as a raw material is needed. When the temperature is low, the reaction proceeds slowly, which is not efficient.

The heating time is not specifically limited, but the aforementioned temperature may be maintained, for example, for 1 to 12 hours. When the heating temperature is low, it takes time to obtain a sulfur-polyacrylonitrile, and when the heating temperature is high, the sulfur-polyacrylonitrile can be obtained within a short time. The temperature and time can be adjusted depending on the devices to be used or the scale.

The inorganic sulfur compound is preferable because of its excellent stability, and specific examples thereof include $TiS_2$, $TiS_3$, $TiS_4$, NiS, $NiS_2$, CuS, $FeS_2$, and $MoS_3$. Above all, $TiS_2$, $TiS_3$, $TiS_4$, NiS, $NiS_2$, $FeS_2$, and $MoS_3$ are preferable, and $TiS_2$ is more preferable.

(2) Material Containing a Lithium-Containing Complex Hydride (Hereinafter, Referred to Also as Doping Agent)

The lithium-containing complex hydride is not specifically limited as long as it can cause doping of the sulfur-based electrode active material with lithium, but is preferably $LiBH_4$, $LiAlH_4$, LiH, $LiNH_2$, $LiNiH_3$, or a compound containing lithium prepared using these. In particular, the material containing a lithium-containing complex hydride is preferably a lithium-ion-conducting solid electrolyte. This is because, even if unreacted and remaining doping agent is present in an electrode during the production of a battery using the sulfur-based electrode active material doped with lithium, the doping agent functions as a solid electrolyte, which therefore does not cause large battery resistance. For example, the material containing a lithium-containing complex hydride is $LiBH_4$ or a combination of $LiBH_4$ and an alkali metal compound represented by Formula (1) below:

MX (1), where

M represents an alkali metal atom selected from the group consisting of a lithium atom, a rubidium atom, and a cesium atom, and X represents a halogen atom or an $NH_2$ group.

The halogen atom serving as X in Formula (1) above, for example, may be an iodine atom, a bromine atom, a fluorine atom, or a chlorine atom. X is preferably an iodine atom, a bromine atom, or an $NH_2$ group, more preferably an iodine atom or an $NH_2$ group.

Specifically, the alkali metal compound is preferably a lithium halide (for example, LiI, LiBr, LiF, or LiCl), a rubidium halide (for example, RbI, RbBr, RbF, or RbCl), a cesium halide (for example, CsI, CsBr, CsF, or CsCl), or a lithium amide ($LiNH_2$), more preferably LiI, RbI, CsI, or $LiNH_2$. As the alkali metal compound, one of these may be used singly, or two or more of these may be used in combination. Preferable combinations include the combination of LiI and RbI.

Known compounds can be used respectively for $LiBH_4$ and the alkali metal compound. Further, the purity of these compounds is preferably 80% or more, more preferably 90% or more. This is because compounds having a purity within the aforementioned range have high performance as a solid electrolyte.

The molar ratio of $LiBH_4$ to the alkali metal compound is preferably 1:1 to 20:1, more preferably 2:1 to 7:1. When the molar ratio falls within the aforementioned range, the amount of $LiBH_4$ can be sufficiently ensured, and high ion conductivity can be obtained. On the other hand, when the amount of $LiBH_4$ is excessively large, the transition temperature of the high temperature phase (high ion conducting phase) is less likely to decrease, and thus there is a tendency that sufficient ion conductivity cannot be obtained at a temperature lower than the transition temperature of the high temperature phase of $LiBH_4$ (115° C.).

In the case of using two or more types of alkali metal compounds in combination, the mixing ratio thereof is not specifically limited. For example, in the case of using LiI and another alkali metal compound (preferably RbI or CsI) in combination, the molar ratio of LiI to the other alkali metal compound is preferably 1:1 to 20:1, more preferably 5:1 to 20:1. This is because such a mixing ratio allows, in the case where a material remains after the lithium doping, the material to act favorably as a solid electrolyte.

The material containing a lithium-containing complex hydride has diffraction peaks preferably at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: λ=1.5405 Å) at less than 115° C. It has diffraction peaks more preferably at at least $2\theta=23.7\pm0.7$ deg, $25.2\pm0.8$ deg, $26.9\pm0.8$ deg, $35.0\pm1.0$ deg, and $41.3\pm1.0$ deg, further preferably at at least $2\theta=23.6\pm0.5$ deg, $24.9\pm0.5$ deg, $26.7\pm0.5$ deg, $34.6\pm0.5$ deg, and $40.9\pm0.5$ deg. Further, it has diffraction peaks particularly preferably at at least $2\theta=23.6\pm0.3$ deg, $24.9\pm0.3$ deg, $26.7\pm0.3$ deg, $34.6\pm0.3$ deg, and $40.9\pm0.3$ deg. These diffraction peaks in the five regions correspond to the diffraction peaks of the high temperature phase of $LiBH_4$. The material having diffraction peaks in the five regions, as described above, even at a temperature lower than the transition temperature of the high temperature phase of $LiBH_4$ tends to exhibit high ion conductivity even at a temperature lower than the aforementioned transition temperature.

The method for preparing the material containing a lithium-containing complex hydride is not specifically limited, but it is preferably prepared, for example, by mechanical milling or melt mixing according to Japanese Patent No. 5187703.

Subsequently, each step of the method for manufacturing a sulfur-based electrode active material doped with lithium will be described.

1-1. Mixing Method

First, the sulfur-based electrode active material is mixed with the material containing a lithium-containing complex hydride. The mixing is preferably performed under an inert gas atmosphere such as argon and helium. The mixing method is not specifically limited, but examples thereof include methods using a grinder, a ball mill, a planetary ball mill, a bead mill, a revolving mixer, a high-speed stirring mixing device, and a tumbler mixer. However, if a method in which large energy is given at the time of mixing, as typified by mixing using a planetary ball mill, is used, not only mixing but also lithium doping or side reaction may possibly proceed simultaneously. Accordingly, in the case where the lithium doping reaction is not intended to proceed during the mixing, as in the case where lithium doping is performed during the production of the electrode or during the production of the battery, which will be described below, a grinder or a tumbler mixer that is capable of mild mixing is preferably used. In the case of small-scale implementation, mortar mixing by hand is preferable. The mixing is preferably performed by a dry process, but also can be performed in the presence of a solvent having reduction resistance. In the case of using a solvent, aprotic non-aqueous solvents are preferable, and more specific examples thereof can include ether solvents such as tetrahydrofuran and diethyl ether, N,N-dimethylformamide, and N,N-dimethylacetamide.

The mixing ratio of the sulfur-based electrode active material to the material containing a lithium-containing complex hydride is not specifically limited, but is preferably in the range of (amount of lithium in lithium-containing complex hydride)/(doping amount of lithium)=1 to 50, more preferably in the range of 2 to 20, particularly preferably in the range of 2 to 10, in a molar ratio, in order to sufficiently ensure the amount of lithium with which the sulfur-based electrode active material is doped. As described above, in the case where the material containing a lithium-containing complex hydride is a solid electrolyte, as being different from the case of using alkyl lithium or metal lithium as a doping agent, excess incorporation rarely causes adverse effects on the electrode reaction, and therefore not much attention needs to be paid to the mixing ratio. However, in the case of forming an electrode without removing the doping agent, when the ratio of the doping agent is increased too much, the ratio of the active material is decreased, resulting in a decrease in charge-discharge capacity per electrode density. Therefore, a suitable mixing ratio is preferably selected. It should be noted that the "doping amount of lithium" means a theoretical amount of lithium that is introducible into the sulfur-based electrode active material, which however can be set to a smaller amount depending on the purpose.

1-2. Lithium Doping

Depending on the mixing method, the sulfur-based electrode active material is doped with lithium during the mixing. However, lithium doping is preferably performed under heating for the purpose of conducting in a short time. In that case, lithium doping is performed by mixing the sulfur-based electrode active material with the material containing a lithium-containing complex hydride and thereafter heating it.

The heating temperature varies depending on the combination of the sulfur-based electrode active material and the material containing a lithium-containing complex hydride, but is, for example, in the range of 60 to 200° C., more preferably 80 to 150° C. The temperature range as described above is indicated as being preferable also by the fact that hydrogen is generated at about 100° C. or higher in the results of a thermal desorption mass spectroscopy for a mixture of $TiS_2$ and $LiBH_4$ (FIG. 5). In FIG. 5, release of hydrogen is detected at mass number=2. It can be seen that the intensity starts to increase to the noise level or higher at about 100° C. that is surrounded by a circular dashed line. When the temperature is higher than the aforementioned range, generation of by-products or material degradation tends to occur. On the other hand, when the temperature is lower than the aforementioned range, it is concerned that the reaction is slowed.

The lithium doping time is preferably 1 to 40 hours, more preferably 2 to 30 hours. When the time is shorter than above, lithium doping may fail to sufficiently proceed in some cases. When the reaction time is longer than necessary, the productivity decreases, and in the case where the process is performed at a high temperature for a long period of time, the occurrence of side reactions is concerned.

1-3. Purification

After the lithium doping, purification can be performed. For purification, a solvent in which the used material containing a lithium-containing complex hydride is dissolved, e.g., ether solvents such as tetrahydrofuran and diethyl ether, and aprotic non-aqueous solvents such as N,N-dimethylformamide and N,N-dimethylacetamide can be used. However, the purification step is not necessarily needed, and particularly in the case of using the sulfur-based electrode active material doped with lithium in a solid-state lithium ion secondary battery, the steps can be simplified by omitting the purification step almost without deteriorating the performance as a battery 2. Electrode The sulfur-based electrode active material doped with lithium obtained by the aforementioned method can be used effectively in an electrode of a lithium ion secondary battery. Accordingly, one embodiment of the present invention provides an electrode containing a sulfur-based electrode active material doped with lithium manufactured by the aforementioned method. In this case, the structure and the manufacturing method of the electrode are the same as those of electrodes in common lithium ion secondary batteries. That is, the electrode can be manufactured by mixing the sulfur-based electrode active material doped with lithium with other electrode materials, and combining the mixture with a current collector. The "other electrode materials" herein mean other materials that can be used as electrode materials such as a binder and a conductive additive, and detailed description will be given below.

Further, lithium doping can be performed also during the production of the electrode, instead of using the sulfur-based electrode active material that has been doped with lithium. That is, one embodiment of the present invention provides a method for manufacturing an electrode, including: preparing a mixture of a sulfur-based electrode active material and a material containing a lithium-containing complex hydride; applying the mixture to a current collector; and doping the sulfur-based electrode active material with lithium by heating the mixture-applied current collector.

Further, one embodiment of the present invention provides an electrode that can be manufactured by the aforementioned method.

Also in the case of performing lithium doping during the production of the electrode, the same effects as in the case of using the sulfur-based electrode active material that has been doped with lithium in advance can be obtained. Further, lithium doping during the production of the electrode under heating, for example, by hot pressing is preferable since a dense and good electrode is formed, and the production time can be shortened.

The details of the material mixing method, the heating temperature, materials to be used in each case are as described above in "1. Manufacture of sulfur-based electrode active material doped with lithium". Further, in the aforementioned a step of "preparing a mixture of a sulfur-based electrode active material and a material containing a lithium-containing complex hydride", other electrode materials as described below may be included. Accordingly, the "mixture" in the step of "applying the mixture to a current collector" also can contain the other electrode materials. Hereinafter, the sulfur-based electrode active material, the material containing a lithium-containing complex hydride, and the other electrode materials may be collectively referred to also as "electrode materials".

The current collector that can be used is not specifically limited, and materials conventionally used as current collectors for lithium ion secondary batteries such as thin plates or meshes of aluminum, stainless steel, copper, nickel, or their alloys can be used therefor. Further, carbon non-woven fabrics, carbon woven fabrics, or the like, also can be used as a current collector.

The electrode materials may include a binder. As the binder, binders commonly used for electrodes of lithium ion secondary batteries can be used. For example, polysiloxane, polyalkylene glycol, polyvinylidene fluoride (PVdF), polytetrafluoroethylene (PTFE), ethylene-vinyl alcohol copolymer (EVOH), or the like, can be used.

A thickener such as carboxymethylcellulose (CMC) also can be used, as needed.

Further, a conductive polymer having electron conductivity or a conductive polymer having ion conductivity may be used as the binder. Examples of the conductive polymer having electron conductivity include polyacetylene. In this case, the binder exerts a function also as conductive additive particles, and therefore there is no need to add a conductive additive.

The content of the binder is not specifically limited, but is preferably 0.1 to 10 mass %, more preferably 0.1 to 4 mass %, with reference to the sum of the masses of the sulfur-based electrode active material, the lithium-containing complex hydride, the conductive additive, and the binder. When the amount of the binder is excessive, the ratio of the active material in the electrode decreases, and the energy density decreases. Therefore, the minimum amount that allows the forming strength of the electrode to be sufficiently ensured is preferable. It should be noted that the lithium-containing complex hydride and the sulfur-based electrode active material have a function as the binder to a not small extent, and therefore it is also possible to produce the electrode without using the binder.

The electrode materials may include a conductive additive. The conductive additive is not specifically limited as long as it has a desired conductivity, but examples thereof can include a conductive additive made of a carbon material. Specific examples thereof include carbon black, acetylene black, Ketjen black, and carbon fibers. It should be noted that some sulfur-based electrode active materials such as $TiS_2$ have high electron conductivity, and in the case of using such a sulfur-based electrode active material, there is no need to use the conductive additive.

The content of the conductive additive varies in relation to the electron conductivity or the weight density of the sulfur-based electrode active material to be used, but the content of the conductive additive is often in the range of 1 to 200 parts by weight, more preferably in the range of 10 to 100 parts by weight, with respect to 100 parts by weight of the sulfur-based electrode active material.

The electrode can be produced by a commonly used method. For example, it can be manufactured by applying the electrode materials onto the current collector, and removing a solvent in the coating materials applied on the current collector.

Examples of the solvent to be used when applying the electrode materials onto the current collector include ether solvents such as tetrahydrofuran and diethyl ether, and aprotic non-aqueous solvents such as N-methyl-2-pyrrolidone and N,N-dimethylformamide.

The application method is not particularly limited, and a method that is commonly employed for producing electrodes can be used. Examples thereof include slit die coating and doctor blading.

The method for removing the solvent in the coating materials applied on the current collector is not specifically limited, and the current collector coated with the coating materials may be dried, for example, under an atmosphere at 80 to 150° C. It should be noted that, in the case of performing lithium doping during the manufacture of the electrode, the heating temperature during the lithium doping and the solvent removing temperature are in the same temperature range, and therefore the time required for manufacturing the electrode can be shortened by simultaneously performing the lithium doping and the solvent removal.

Then, the thus produced electrode may be pressed, for example, using a roll pressing device, as needed. The linear pressure in roll pressing, for example, can be 10 to 50 kgf/cm.

It should be noted that the electrode can be produced also without using the solvent by a method of forming the mixed powders of the electrode materials by pressing, a method of vibrating the mixed powders after placing them on the current collector, and a method of filling porous portions of the current collector with the electrode materials, for example, by pushing them into the porous portions with a spatula or the like.

The thickness of the electrode is not specifically limited as long as the function as an electrode is exerted, but is preferably 1 μm to 1000 μm, more preferably 10 μm to 200 μm.

3. Lithium Ion Secondary Battery

The thus produced electrode can be used in a lithium ion secondary battery. That is, one embodiment of the present invention provides a lithium ion secondary battery including the aforementioned electrode is provided.

The lithium ion secondary battery can be manufactured by a known method. The electrode of the present invention can be used for both a positive-electrode layer and a negative-electrode layer, but it is preferable that one electrode be the electrode according to the present invention, and the other electrode be an electrode free of lithium. For example, in the case of using the electrode of the present invention as a positive-electrode layer, a carbon material such as known graphite, a silicon material, or an alloy material such as Cu—Sn and Co—Sn is preferably used as a negative-electrode active material.

Examples of liquid electrolytes which can be used include aprotic high-dielectric constant solvents such as ethylene carbonate, propylene carbonate, butylene carbonate, and γ-butyrolactone; and aprotic low-viscosity solvents such as dimethyl carbonate, ethyl methyl carbonate, methyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methyl sulfolane, acetonitrile, propionitrile, anisole, acetic acid esters such as methyl acetate or propionic acid esters. As the electrolyte, a solution in which a lithium salt such as lithium perchlorate, $LiPF_6$, $LiBF_4$, and $LiCF_3SO_3$ is dissolved at a concentration of about 0.5 mol/l to 1.7 mol/l can be used. Further, a lithium ion secondary battery may be assembled by a conventional method using other known battery components.

The present invention can be used also for solid-state batteries. That is, according to one embodiment of the present invention, the aforementioned lithium ion secondary battery is a solid-state battery. Hereinafter, the solid-state battery will be described.

The solid-state battery has a structure in which a solid electrolyte layer is disposed between a positive-electrode layer and a negative-electrode layer. The solid-state lithium ion secondary battery has a following problem: most of solid electrolytes react with metal lithium, and therefore the method of the present invention that does not use metal lithium is particularly useful. In the case of using the sulfur-based electrode active material doped with lithium as a positive electrode, an active material free of lithium such as an indium foil, a carbon electrode active material, and a Si electrode active material can be used as a negative electrode, and therefore the aforementioned problem of degradation of the solid electrolyte and the problems described in Background Art can be solved.

Hereinafter, each member constituting the solid-state battery will be described by way of an example in the case of using the present invention in a positive-electrode layer. However, there is no limitation to this aspect.

(1) Positive-Electrode Layer

The configuration and the production method of the positive-electrode layer are as described in the aforementioned section "2. Electrode". However, in the case where the positive-electrode layer, the solid-electrolyte layer, and the negative-electrode layer are integrally formed in "(4) Method for producing solid-state battery", which will be described below, it is also possible to dispose the current collector after they are integrally formed.

The thickness of the positive-electrode layer is not specifically limited as long as the function as a positive-electrode layer is exerted, but is preferably 1 μm to 1000 more preferably 10 μm to 200 μm.

(2) Solid-Electrolyte Layer

The solid electrolyte layer is a lithium-ion-conducting layer disposed between the positive-electrode layer and the negative-electrode layer, and is formed by using a lithium-ion-conducting solid electrolyte. As the solid electrolyte, complex hydride solid electrolytes, oxide materials, sulfide materials, polymer materials, $Li_3N$, or the like, can be used. More specifically, examples thereof include oxide glasses such as $Li_3PO_4$—$Li_4SiO_4$ and $Li_3BO_4$—$Li_4SiO_4$; perovskite oxides such as $La_{0.5}Li_{0.5}TiO_3$; NASICON oxides such as $Li_{1.3}Al_{0.3}Ti_{1.7}(PO_4)_3$ and $Li_{1.5}Al_{0.5}Ge_{1.5}(PO_4)_3$; LISICON oxides such as $Li_{14}Zn(GeO_4)_4$, $Li_3PO_4$, and $Li_4SiO_4$; garnet oxides such as $Li_7La_3Zr_2O_{12}$, $Li_5La_3Ta_2O_{12}$, and $Li_5La_3Nb_2O_{12}$; sulfide glass or sulfide glass ceramics such as $Li_2S$—$P_2S_5$, $80Li_2S$-$20P_2S_5$, $70Li_2S$-$27P_2S_5$-$3P_2O_5$, and $Li_2S$—$SiS_2$; thio-LISICON materials such as $Li_{3.25}Ge_{0.25}P_{0.75}S_4$, $Li_4SiS_4$, $Li_4GeS_4$, and $Li_3PS_4$; $Li_{10}GeP_2S_{12}$ having high lithium ion conductivity; materials, called UPON, obtained by partially nitriding $Li_3PO_4$ (examples of the composition thereof include $Li_{3.3}PO_{3.8}N_{0.22}$ and $Li_{2.9}PO_{3.3}N_{0.46}$); and polymer materials such as polyethylene oxide, polyacrylonitrile, and poly (cyano ethoxy vinyl) derivatives (CNPVA). Above all, a complex hydride solid electrolyte is preferable since it forms good interface with the aforementioned positive-electrode layer. As the complex hydride solid electrolyte, the same material as described above as the material containing a lithium-containing complex hydride can be used.

The solid electrolyte layer may contain materials other than above, as needed. For example, the solid electrolyte layer formed into a sheet using a binder also can be used.

The thickness of the solid electrolyte layer is preferably smaller. Specifically, the thickness is preferably in the range of 0.05 μm to 1000 μm, more preferably in the range of 0.1 μm to 200 μm.

(3) Negative-Electrode Layer

The negative-electrode layer is a layer containing at least a negative-electrode active material, and may contain a solid electrolyte, a conductive additive, a binder, and the like, as needed.

As the negative-electrode active material, a metal active material and a carbon active material, for example, can be used. Examples of the aforementioned metal active material include In, Al, Si, and Sn, and alloys of these metals. Meanwhile, examples of the aforementioned carbon active material include mesocarbon microbead (MCMB), highly oriented pyrolytic graphite (HOPG), hard carbon, and soft carbon. In particular, use of an active material having a lower electrode potential as a negative electrode improves the battery energy density and enhances the operating voltage, which is therefore preferable. Examples of such a negative-electrode active material include a carbon active material and Si.

The solid electrolyte to be used for the negative-electrode layer is not specifically limited as long as it has lithium ion conductivity and is stable with the negative-electrode active material, but a complex hydride solid electrolyte, for example, can be used. The complex hydride solid electrolyte is comparatively soft, and therefore can form a good interface with the negative-electrode active material such as graphite, while being stable to reduction, which is therefore preferable. The negative-electrode layer is preferably of bulk type containing both the negative-electrode active material and the solid electrolyte. As the complex hydride solid electrolyte to be contained in the negative-electrode layer, the same material as described above as the material containing a lithium-containing complex hydride can be used. In particular, it is preferable that the same complex hydride solid electrolyte be contained in the negative-electrode layer and the solid-electrolyte layer. This is because, if layers containing solid electrolytes with different compositions are in contact with each other, it is highly possible that the solid electrolytes react with each other, or constituent elements of the solid electrolytes diffuse in the respective layers, which may result in a decrease in lithium ion conductivity The ratio of the negative-electrode active material to the solid electrolyte is favorably higher within the range in which the shape of the negative electrode can be maintained, and necessary ion conductivity can be ensured. For example, the ratio is preferably in the range of negative-electrode active material:solid electrolyte=9:1 to 1:9, more preferably 8:2 to 2:8, in a weight ratio.

As the conductive additive to be used for the negative-electrode layer, the same conductive additive as in the positive-electrode layer can be used. The percentage of the conductive additive with respect to the total mass of the negative-electrode layer forming materials is, for example, 0.1 mass % to 20 mass %, preferably 3 mass % to 15 mass %. The negative-electrode layer forming materials herein include the negative-electrode active material, and optionally include the solid electrolyte, the conductive additive, and the binder, for example.

As the binder to be used for the negative-electrode layer, binders commonly used for negative-electrode layers of lithium ion secondary batteries can be used. Examples thereof include polysiloxane, polyalkylene glycol, polyvinylidene fluoride (PVdF), polytetrafluoroethylene (PTFE), styrene-butadiene rubber (SBR), and polyacrylic acid. A thickener such as carboxymethylcellulose (CMC) also can be used, as needed.

The thickness of the negative-electrode layer is not limited as long as the function as the negative-electrode layer is exerted, but is preferably 0.05 μm to 1000 μm, more preferably 0.1 μm to 200 μm.

(4) Method for Producing Solid-State Battery

A solid-state battery is manufactured by producing the aforementioned layers and laminating them, but the production method and the lamination method of each layer are not specifically limited. Examples thereof include: a method for forming a film by forming a slurry by dispersing a solid electrolyte or an electrode active material in a solvent and applying the slurry by doctor blading, spin coating, or the like, followed by rolling; a vapor phase method in which film forming and lamination are performed by vacuum evaporation, ion plating, sputtering, laser ablation, or the like; and a pressing method in which powder is formed and laminated by hot pressing or cold pressing without heating. In the case of using the complex hydride solid electrolyte or sulfide solid electrolyte that is comparatively soft, it is particularly preferable that a battery be produced by forming and laminating each layer by pressing. Examples of the pressing method include hot pressing that is performed under heating and cold pressing that is performed without heating, either of which may be appropriately selected depending on the combination of the solid electrolyte and the active material. It is preferable that the layers be integrally formed by pressing at a pressure of preferably 50 to 800 MPa, more preferably 114 to 500 MPa. A layer having good adhesion and fewer voids between particles can be obtained by pressing at the pressure in the aforementioned range, which is therefore preferable in view of the ion conductivity. Increasing the pressure more than necessary is not practical because it requires use of a pressing apparatus and a forming container made of expensive materials, and their useful life is shortened.

Lithium doping into the sulfur-based electrode active material can be performed also after forming the battery. In this case, the electrode is produced in the same manner as in the case of performing lithium doping during the production of the electrode, but heating is not performed at that time, and heating is performed after the battery is formed. The heating temperature is the same as in the case of doping the sulfur-based electrode active material with lithium in advance or in the case of performing lithium doping during the production of the electrode. Even in the case of performing lithium doping during the production of the battery, the same effects described above as in the case of manufacturing the sulfur-based electrode active material doped with lithium in advance can be obtained.

EXAMPLES

Example A

Hereinafter, the first aspect of the present invention will be described in detail by way of examples, but the contents of the present invention are not limited by these examples.

Example A1

(Preparation of Complex Hydride Solid Electrolyte)

Within a glove box under an argon atmosphere, $LiBH_4$ (with a purity of 90%, manufactured by Sigma-Aldrich Co.

LLC.) was weighed out, and milled in an agate mortar, to obtain a complex hydride solid electrolyte ($LiBH_4$).

(Preparation of Positive-Electrode Layer Powder)

Powders were weighed out within a glove box in a weight ratio of positive-electrode active material $TiS_2$ (with a purity of 99.9%, manufactured by Sigma-Aldrich Co. LLC.):complex hydride solid electrolyte ($LiBH_4$)=2:3, and mixed in a mortar, to give a positive-electrode layer powder.

(Production of Solid-State Battery)

The powder of the complex hydride solid electrolyte prepared above was put into an 8-mm diameter powder tableting machine and was press-formed at a pressure of 143 MPa into a disk shape (formation of complex hydride solid-electrolyte layer). Without taking out the formed product, the positive-electrode layer powder prepared above was put into the tableting machine and was integrally formed at a pressure of 285 MPa. Thus, a disk-shaped pellet in which the positive-electrode layer (75 μm) and the complex hydride solid electrolyte layer (300 μm) were laminated together was obtained. To the surface of the pellet opposite to the positive-electrode layer, a metal lithium foil with a thickness of 200 μm and a diameter of 8 mm (manufactured by Honjo Metal Co., Ltd.) was attached so as to form a Li negative-electrode layer, and the resultant was put into a battery test cell made of SUS304 to form a solid-state secondary battery (SEM Observation)

The thus produced pellet composed of the positive-electrode layer and the solid-electrolyte layer of the solid-state battery was formed into a thin film using an FIB apparatus (FB2200, manufactured by Hitachi High-Technologies Corporation), and the cross section of the positive-electrode layer was observed using an FE-SEM (SU9000, manufactured by Hitachi High-Technologies Corporation). The appearance of the cross section is shown in FIG. 2. In FIG. 2, a portion that appears to be black is the complex hydride solid electrolyte ($LiBH_4$), and a portion that appears to be white is the positive-electrode active material ($TiS_2$). It can be seen from FIG. 2 that the complex hydride solid electrolyte ($LiBH_4$) and the positive-electrode active material ($TiS_2$) crush to each other, and a good interface is formed between them. As mentioned above, this is due to both of $LiBH_4$ and $TiS_2$ being soft.

(Charge-Discharge Test)

The thus produced solid-state battery was subjected first to discharge, followed by charge and discharge, at a constant current under conditions of a test temperature of 120° C., a cut-off voltage of 1.6 to 2.7 V, and a rate of 0.1 C, using a potentiostat/galvanostat (VMP3, manufactured by Bio-Logic Science Instruments), to determine the charge-discharge capacity. It should be noted that a pause for 3 minutes was provided after each of charge and discharge.

Example A2

Powders of a complex hydride solid electrolyte and a positive-electrode layer were prepared in the same manner as in Example A1.

(Production of Solid-State Battery)

The powder of the complex hydride solid electrolyte was put into an 8-mm diameter powder tableting machine and was press-formed at a pressure of 143 MPa into a disk shape. Without taking out the formed product, the positive-electrode layer powder was put therein and was integrally formed at a pressure of 285 MPa. Thus, a disk-shaped pellet in which the positive-electrode layer (75 μm) and the complex hydride solid electrolyte layer (300 μm) were laminated together was obtained. To this pellet, an indium foil with a thickness of 250 μm and a diameter of 8 mm was attached, and a metal lithium foil with a thickness of 200 μm and a diameter of 8 mm was further attached thereon, to form a negative-electrode layer for forming Li—In alloy, and the resultant was put into a battery test cell made of SUS304 to form a solid-state secondary battery.

(Charge-Discharge Test)

The thus produced solid-state electrolyte battery was heated to 120° C., and was allowed to stand still for about 2 hours, thereby forming Li—In alloy. This generated an electromotive force. Thereafter, it was subjected first to discharge, followed by charge and discharge, at a constant current under conditions of a test temperature of 120° C., a cut-off voltage of 1.15 to 2.25 V (1.77 to 2.87 V with reference to Li), and a rate of 0.1 C, to determine the charge-discharge capacity.

Example A3

(Preparation of Positive-Electrode Active Material)

Within a glove box under an argon atmosphere, $TiS_2$ (with a purity of 99.9%, manufactured by Sigma-Aldrich Co. LLC.) and sulfur (S) (with a purity of 99.98%, manufactured by Sigma-Aldrich Co. LLC.) were weighed out in a molar ratio of $TiS_2$:S=1:2 and mixed in an agate mortar. Next, the mixed starting materials were put into a 45-mL pot made of SUJ-2, and balls made of SUJ-2 (20 balls with a diameter of 7 mm) were further put therein. Then, the pot was completely sealed. This pot was mounted on a planetary ball mill (P7, manufactured by Fritsch Japan Co., Ltd.), and mechanical milling was performed at a rotation rate of 400 rpm for 10 hours, to obtain a positive-electrode active material ($TiS_4$).

(Preparation of Positive-Electrode Layer Powder)

The materials of the positive-electrode layer were weighed out within a glove box in a weight ratio of $TiS_4$ prepared above:complex hydride solid electrolyte ($LiBH_4$):carbon black (with a purity of 99.9%, manufactured by Sigma-Aldrich Co. LLC.)=40:60:6 and mixed in a mortar, to give a positive-electrode layer powder.

(Production of Solid-State Battery)

A solid-state battery was produced in the same manner as in Example A1, except that the aforementioned positive-electrode layer powder was used. The charge-discharge test was performed in the same manner as in Example A1, except that the test was performed under the conditions of a cut-off voltage of 1.9 to 3.0 V and a rate of 0.05 C.

Example A4

(Preparation of Complex Hydride Solid Electrolyte)

Within a glove box under an argon atmosphere, $LiBH_4$ (with a purity of 90%, manufactured by Sigma-Aldrich Co. LLC.) and LiI (with a purity of 99.999%, manufactured by Sigma-Aldrich Co. LLC.) were mixed in an agate mortar in a molar ratio of $LiBH_4$:LiI=3:1. Next, the mixed starting materials were put into a 45-mL pot made of SUJ-2, and balls made of SUJ-2 (20 balls with a diameter of 7 mm) were further put therein. Then, the pot was completely sealed. This pot was mounted on a planetary ball mill (P7, manufactured by Fritsch Japan Co., Ltd.), and mechanical milling was performed at a rotation rate of 400 rpm for 5 hours, to obtain a complex hydride solid electrolyte ($3LiBH_4$—LiI).

(Preparation of Positive-Electrode Layer Powder)

Powders were weighed out within a glove box in a weight ratio of positive-electrode active material $TiS_2$ (with a purity of 99.9%, manufactured by Sigma-Aldrich Co. LLC.):complex hydride solid electrolyte ($3LiBH_4$—LiI)=2:3 and mixed in a mortar, to give a positive-electrode layer powder.
(Production of Solid-State Battery)
A solid-state battery was produced in the same manner as in Example A1, except that the powders of the solid electrolyte and the positive-electrode layer prepared above were used.
(Charge-Discharge Test)
The thus produced solid-state battery was heated at 120° C. for 2 hours, thereby allowing the solid electrolyte layer to adhere to the metal lithium foil. Thereafter, the battery was subjected first to discharge, followed by charge and discharge, at a constant current under conditions of a test temperature of 60° C., a cut-off voltage of 1.75 to 2.85 V, and a rate of 0.1 C, using a potentiostat/galvanostat (VMP3, manufactured by Bio-Logic Science Instruments), to determine the charge-discharge capacity. It should be noted that a pause for 3 minutes was provided after each of charge and discharge.

Example A5

(Charge-Discharge Test)
The charge-discharge test was performed in the same manner as in Example A4, except that the solid-state battery after the test of Example A4 was used, and the test temperature was changed to 120° C.

Example A6

(Preparation of Positive-Electrode Active Material)
Sulfur (S) (with a purity of 99.98%, manufactured by Sigma-Aldrich Co. LLC.), Ketjen black (EC600JD, manufactured by Lion Corporation), and Maxsorb® (MSC30, manufactured by Kansai Coke and Chemicals Company, Limited) were put into a 45-mL pot made of SUJ-2 in a weight ratio of S:Ketjen black:Maxsorb®=50:25:25. Balls made of SUJ-2 (20 balls with a diameter of 7 mm) were further put therein. Then, the pot was completely sealed. This pot was mounted on a planetary ball mill (P7, manufactured by Fritsch Japan Co., Ltd.), and mechanical milling was performed at a rotation rate of 400 rpm for 20 hours, to obtain an S-carbon composite positive-electrode active material.
(Preparation of Positive-Electrode Layer Powder)
Powders were weighed out within a glove box in a weight ratio of S-carbon composite positive-electrode active material prepared above:complex hydride solid electrolyte ($LiBH_4$)=1:1 and mixed in a mortar, to give a positive-electrode layer powder.
(Production of Solid-State Battery)
A solid-state battery was produced in the same manner as in Example A1, except that the positive-electrode layer powder prepared above was used.
(Charge-Discharge Test)
The thus produced solid-state battery was subjected first to discharge, followed by charge and discharge, at a constant current under conditions of a test temperature of 120° C., a discharge cut-off capacity of 789 mAh/g (per sulfur) or a discharge cut-off voltage of 1.0 V, a charge cut-off voltage of 2.5 V, and a rate of 0.05 C, using a potentiostat/galvanostat (VMP3, manufactured by Bio-Logic Science Instruments), to determine the charge-discharge capacity Example A7

(Preparation of Positive-Electrode Active Material)
Sulfur (S) (with a purity of 99.98%, manufactured by Sigma-Aldrich Co. LLC., powder) and polyacrylonitrile (with a weight-average molecular weight of 150,000, manufactured by Sigma-Aldrich Co. LLC.) were mixed in an agate mortar in a weight ratio of S:polyacrylonitrile=3:1. 2 g of the milky mixture was placed on a boat made of quartz, and the boat was enclosed in a tubular electric furnace (alumina tube: with an outer diameter of 42 mm, an inner diameter of 35 mm, and a length of 600 mm; and heater length: 250 mm). An argon gas was flowed at a flow rate of 50 mL/minute, to sufficiently replace the internal air with the argon gas, and the temperature thereof was thereafter raised at 400° C./hour to 450° C. The boat was kept as it was at 450° C. for 8 hours, followed by natural cooling to obtain 0.7 g of black sulfur-polyacrylonitrile. As a result of CHNS analysis (FLASH EA 1112, manufactured by Thermo Fisher Scientific Inc.), the sulfur-polyacrylonitrile (sulfur-PAN) obtained above had a composition of 41.6 wt % carbon, 15.6 wt % nitrogen, 40.8 wt % sulfur, and less than 1 wt % hydrogen.
(Preparation of Positive-Electrode Layer Powder)
Powders were weighed out within a glove box in a weight ratio of sulfur-polyacrylonitrile prepared above:complex hydride solid electrolyte ($LiBH_4$):carbon black (manufactured by Sigma-Aldrich Co. LLC.)=16:76:8 and mixed in a mortar, to give a positive-electrode layer powder.
(Production of Solid-State Battery)
A solid-state battery was produced in the same manner as in Example A1, except that the positive-electrode layer powder prepared above was used.
(Charge-Discharge Test)
The charge-discharge test was performed in the same manner as in Example A1, except that the solid-state battery produced above was used, and the cut-off voltage was changed to 1.0 to 3.0 V.

Example A8

(Preparation of Positive-Electrode Active Material)
Sulfur (S) (with a purity of 99.98%, manufactured by Sigma-Aldrich Co. LLC.) and nickel (Ni) (Ni fine powder NIE10PB, manufactured by Kojundo Chemical Laboratory Co., Ltd.) were put into a 45-mL pot made of zirconia in a molar ratio of S:Ni=1:1. Balls made of zirconia (62 g, with a diameter of 5 mm) were further put therein. Then, the pot was completely sealed. This pot was mounted on a planetary ball mill (P7, manufactured by Fritsch Japan Co., Ltd.), and mechanical milling was performed at a rotation rate of 370 rpm for 24 hours, to obtain NiS.
(Preparation of Positive-Electrode Layer Powder)
Powders were weighed out within a glove box in a weight ratio of NiS prepared above:complex hydride solid electrolyte ($LiBH_4$):carbon black (manufactured by Sigma-Aldrich Co. LLC.)=60:40:6 and mixed in a mortar, to give a positive-electrode layer powder.
(Production of Solid-State Battery)
A solid-state battery was produced in the same manner as in Example A1, except that the positive-electrode layer powder prepared above was used.
(Charge-Discharge Test)
The thus produced solid-state battery was subjected first to discharge, followed by charge and discharge, at a constant current under conditions of a test temperature of 120° C., a discharge cut-off voltage of 1.0 V, a charge cut-off voltage of 3.0 V, and a rate of 0.1 C, using a potentiostat/galvanostat (VMP3, manufactured by Bio-Logic Science Instruments), to determine the charge-discharge capacity.

Example A9

(Preparation of Positive-Electrode Active Material)

Sulfur (S) (with a purity of 99.98%, manufactured by Sigma-Aldrich Co. LLC.) and iron (Fe) (Fe fine powder FEE12PB, manufactured by Kojundo Chemical Laboratory Co., Ltd.) were put into a 45-mL pot made of zirconia in a molar ratio of S:Fe=2:1. Balls made of zirconia (62 g, with a diameter of 5 mm) were further put therein. Then, the pot was completely sealed. This pot was mounted on a planetary ball mill (P7, manufactured by Fritsch Japan Co., Ltd.), and mechanical milling was performed at a rotation rate of 370 rpm for 24 hours, to obtain $FeS_2$.

(Preparation of Positive-Electrode Layer Powder)

Powders were weighed out within a glove box in a weight ratio of $FeS_2$ prepared above:complex hydride solid electrolyte ($LiBH_4$):carbon black (manufactured by Sigma-Aldrich Co. LLC.)=60:40:6 and mixed in a mortar, to give a positive-electrode layer powder.

(Production of Solid-State Battery)

A solid-state battery was produced in the same manner as in Example A1, except that the positive-electrode layer powder prepared above was used.

(Charge-Discharge Test)

The charge-discharge test was performed on the thus produced solid-state battery in the same manner as in Example A8.

Example A10

(Preparation of Positive-Electrode Layer Powder)

Powders were weighed out within a glove box in a weight ratio of $MoS_2$ (with a purity of 99%, manufactured by Sigma-Aldrich Co. LLC.):complex hydride solid electrolyte ($LiBH_4$)=60:40 and mixed in a mortar, to give a positive-electrode layer powder.

(Production of Solid-State Battery)

A solid-state battery was produced in the same manner as in Example A1, except that the positive-electrode layer powder prepared above was used.

(Charge-Discharge Test)

The charge-discharge test was performed on the thus produced solid-state battery in the same manner as in Example A8, except that the charge cut-off voltage was changed to 2.1 V.

Comparative Example A1

(Preparation of Positive-Electrode Layer Powder)

Powders were weighed out within a glove box in a weight ratio of positive-electrode active material $LiCoO_2$ (CELLSEED C-5H, manufactured by NIPPON CHEMICAL INDUSTRIAL CO., LTD.):complex hydride solid electrolyte ($LiBH_4$):carbon black (with a purity of 99.9%, manufactured by Sigma-Aldrich Co. LLC.)=40:60:6 and mixed in a mortar, to give a positive-electrode layer powder.

A solid-state battery was produced in the same manner as in Example A1, except that the aforementioned positive-electrode layer powder was used, and the cut-off voltage was changed to 3.2 to 4.2 V. The charge-discharge test was performed in the same manner as in Example A1, except that the test was started with charge.

Comparative Example A2

(Preparation of Positive-Electrode Layer Powder)

Powders were weighed out within a glove box in a weight ratio of positive-electrode active material $LiFePO_4$ (SLFP-ES01):complex hydride solid electrolyte ($LiBH_4$):carbon black (with a purity of 99.9%, manufactured by Sigma-Aldrich Co. LLC.)=40:60:6 and mixed in a mortar, to give a positive-electrode layer powder.

A solid-state battery was produced in the same manner as in Example A1, except that the aforementioned positive-electrode layer powder was used, and the cut-off voltage was changed to 2.5 to 3.8 V. The charge-discharge test was performed in the same manner as in Example A1, except that the test was started with charge.

The battery configurations of Examples A1 to A10 and Comparative Examples A1 and A2 described above are collectively shown in Table 1 below.

TABLE 1

| | Battery configuration | | |
|---|---|---|---|
| | Positive-electrode layer | Solid-electrolyte layer | Negative-electrode layer |
| Example A1 | $TiS_2$, $LiBH_4$ | $LiBH_4$ | Lithium foil |
| Example A2 | $TiS_2$, $LiBH_4$ | $LiBH_4$ | Indium-lithium foil |
| Example A3 | $TiS_4$, $LiBH_4$, Carbon black | $LiBH_4$ | Lithium foil |
| Example A4 | $TiS_2$, $3LiBH_4$—LiI | $3LiBH_4$—LiI | Lithium foil |
| Example A5 | $TiS_2$, $3LiBH_4$—LiI | $3LiBH_4$—LiI | Lithium foil |
| Example A6 | S-carbon composite, $LiBH_4$ | $LiBH_4$ | Lithium foil |
| Example A7 | Sulfur-PAN, $LiBH_4$, Carbon black | $LiBH_4$ | Lithium foil |
| Example A8 | NiS, $LiBH_4$, Carbon black | $LiBH_4$ | Lithium foil |
| Example A9 | $FeS_2$, $LiBH_4$, Carbon black | $LiBH_4$ | Lithium foil |
| Example A10 | $MoS_2$, $LiBH_4$, Carbon black | $LiBH_4$ | Lithium foil |
| Comparative Example A1 | $LiCoO_2$, $LiBH_4$, Carbon black | $LiBH_4$ | Lithium foil |
| Comparative Example A2 | $LiFePO_4$, $LiBH_4$, Carbon black | $LiBH_4$ | Lithium foil |

The transitions in discharge capacity of the batteries produced in Examples A1 and A6 to A10 are respectively shown in FIG. 3A to FIG. 3F (FIG. 3A: Example A1, FIG. 3B: Example A6, FIG. 3C: Example A7, FIG. 3D: Example A8, FIG. 3E: Example A9, and FIG. 3F: Example A10). Further, the charge-discharge curves of Example A1 at the 1st, 2nd, and 45th cycles are shown in FIG. 4A. The charge-discharge curves of Example A6 at the 2nd, 3rd, and 45th cycles are shown in FIG. 4B. The charge-discharge curves of Example A7 at the 2nd, 3rd, and 20th cycles are shown in FIG. 4C. Further, the battery resistance, the coulomb efficiency, and the discharge capacity of the batteries produced in Examples A1 to A10 at the 2nd cycle and the 20th cycle are shown in Table 2 below. It should be noted that the charge-discharge capacity was calculated by taking the charge-discharge capacity obtained for the tested battery as a value per gram of the positive-electrode active material. However, the charge-discharge capacity of Examples A6, A8, and A9 was calculated by taking it as a value per gram of sulfur. The battery resistance was calculated from the IR drop at one second after the pause of charge. The coulomb efficiency was calculated from the charge capacity/the discharge capacity. The phrase "No discharge capacity obtained" indicates that the discharge capacity per gram of the active material was less than 5 mAh.

TABLE 2

| | Test temperature °C. | Charge and discharge rate C rate | Battery resistance 2nd cycle Ω | Battery resistance 20th cycle Ω | Coulomb efficiency 2nd cycle % | Coulomb efficiency 20th cycle % | Discharge capacity 2nd cycle mAh/g | Discharge capacity 20th cycle mAh/g |
|---|---|---|---|---|---|---|---|---|
| Example A1 | 120 | 0.1 | 52 | 78 | 99.8 | 98.7 | 201 | 201 |
| Example A2 | 120 | 0.1 | 213 | 343 | 106 | 99.7 | 205 | 201 |
| Example A3 | 120 | 0.05 | 80 | 130 | 92.0 | 98.5 | 453 | 158 |
| Example A4 | 60 | 0.1 | 2582 | 3005 | 101 | 98.4 | 197 | 77 |
| Example A5 | 120 | 0.1 | 65 | 137 | 100 | 100 | 212 | 186 |
| Example A6 | 120 | 0.05 | 52 | 56 | 91.7 | 101 | 789 | 734 |
| Example A7 | 120 | 0.1 | 204 | 346 | 101 | 99.4 | 562 | 502 |
| Example A8 | 120 | 0.1 | 788 | 518 | 100 | 96.7 | 1283 | 637 |
| Example A9 | 120 | 0.1 | 389 | 256 | 117 | 102 | 404 | 344 |
| Example A10 | 120 | 0.1 | 215 | 389 | 103 | 98.8 | 87.6 | 75.2 |
| Comparative Example A1 | 120 | 0.1 | No discharge capacity obtained | | | | | |
| Comparative Example A2 | 120 | 0.1 | No discharge capacity obtained | | | | | |

For Comparative Examples A1 and A2, no discharge capacity was obtained, and the function as a battery was not exerted. It can be seen from the aforementioned test results that, in the solid-state batteries according to the embodiments of the present invention, the battery resistance is less likely to increase, and accordingly the discharge capacity is less likely to decrease, even if charge/discharge cycles are repeated. Therefore, it can be said that the solid-state batteries according to the embodiments of the present invention are capable of stably operating over a long period of time. Further, the solid-state batteries according to the embodiments of the present invention turned out to have another advantage that the coulomb efficiency is less likely to decrease, even after charge/discharge cycles are repeated.

Further, as described above, according to the embodiments of the present invention, the complex hydride with high lithium ion conductivity can be used as a solid electrolyte without concern about the reduction of the positive-electrode active material by the complex hydride. Further, a good interface is formed between the positive-electrode active material and the solid electrolyte, as a result of which the interfacial resistance is decreased, and the lithium ion conductivity of the battery as a whole also can be improved.

Example B

Hereinafter, the second aspect of the present invention will be described in detail by way of examples, but the contents of the present invention are not limited by these examples.

Example B1

(1) Mixing of Sulfur-Based Electrode Active Material with Lithium-Containing Complex Hydride Powders were weighed out within a glove box in a weight ratio of sulfur-based electrode active material $TiS_2$ (with a purity of 99.9%, manufactured by Sigma-Aldrich Co. LLC.):lithium-containing complex hydride ($LiBH_4$, with a purity of 90%, manufactured by Sigma-Aldrich Co. LLC.)= 2:3 and mixed in a mortar.

(2) Thermal Desorption Mass Spectroscopy

The powder obtained above was subjected to thermal desorption mass spectroscopy (detector: M-200QA, manufactured by CANON ANELVA CORPORATION) in an argon stream at a rate of temperature increase of 5° C./minute. The results are shown in FIG. 5. It can be seen from this that lithium doping starts at about 100° C.

(3) Lithium Doping

Lithium doping was performed by heating the mixture obtained in (1) at 120° C. for 2 hours under an argon atmosphere.

(4) X-Ray Diffraction Measurement

The powder obtained in (3) was subjected to X-ray diffraction measurement (X'Pert Pro, manufactured by PANalytical B.V., CuKα: λ=1.5405 Å) at room temperature. The results are shown in FIG. 6A. In FIGS. 6A to 6C, the X-ray diffraction spectrum of the low temperature phase of $LiBH_4$, the X-ray diffraction spectrum of $TiS_2$, and the X-ray diffraction spectrum of the mixture obtained in (1) are also shown. It can be seen from FIG. 6A that the peaks of $TiS_2$ are shifted by lithium doping.

Further, the a- and c-axis lattice constants of the powder obtained in (3) described above were determined (space group P-3m1 (164)), using an analysis software program (HighScore Plus, manufactured by PANalytical B.V.). As a result, the a-axis was 0.3436 nm, and the c-axis was 0.6190 nm. These values were applied to a previously reported graph (Solid State Comm. 40 (1981) 245-248) indicating the relationship of the lithium content to the a- and c-axis lattice constants (FIG. 7). It turned out from the lithium content read in FIG. 7 that the composition formula of the powder obtained in (3) described above was $Li_{0.80}TiS_2$. It should be noted that the lithium content in the composition formula is shown as an average of a value derived from the a-axis lattice constant and a value derived from the c-axis lattice constant.

Example B2

Lithium doping was performed in the same manner as in Example B1, except that the lithium doping time was changed to 20 hours. The results of X-ray diffraction measurement are shown in FIG. 6B. As a result of the determination of the lithium content in the same manner as in Example B1, it turned out that the composition formula of the obtained powder was $Li_{0.95}TiS_2$.

Example B3

(1) Preparation of Material Containing a Lithium-Containing Complex Hydride

Within a glove box under an argon atmosphere, $LiBH_4$ (with a purity of 90%, manufactured by Sigma-Aldrich Co. LLC.) and LiI (with a purity of 99.999%, manufactured by Sigma-Aldrich Co. LLC.) were mixed in an agate mortar in a molar ratio of LiBH$_4$:LiI=3:1. Next, the mixed starting materials were put into a 45-mL pot made of SUJ-2, and balls made of SUJ-2 (20 balls with a diameter of 7 mm) were further put therein. Then, the pot was completely sealed. This pot was mounted on a planetary ball mill (P7, manufactured by Fritsch Japan Co., Ltd.), and mechanical milling was performed at a rotation rate of 400 rpm for 5 hours, to obtain a material containing a lithium-containing complex hydride (3LiBH$_4$—LiI).

(2) Lithium Doping and X-Ray Diffraction Measurement

The mixing and lithium doping were performed in the same manner as in Example B1, except that 3LiBH$_4$—LiI was used instead of LiBH$_4$. The X-ray diffraction measurement was also performed in the same manner as in Example B1, and the results are shown in FIG. 6C. Further, the a- and c-axis lattice constants were also determined in the same manner as in Example B1, to obtain the lithium content using FIG. 7, as a result of which it turned out that the composition formula was Li$_{0.66}$TiS$_2$.

Example B4

Lithium doping was performed in the same manner as in Example B1, except that the raw material ratio was changed to a weight ratio of TiS$_2$ (with a purity of 99.9%, manufactured by Sigma-Aldrich Co. LLC.):lithium-containing complex hydride (LiBH$_4$, with a purity of 90%, manufactured by Sigma-Aldrich Co. LLC.)=3:1. As a result of the determination of the lithium content in the same manner as in Example B1, it turned out that the composition formula of the obtained powder was Li$_{0.05}$TiS$_2$.

Example B5

Lithium doping was performed in the same manner as in Example B4, except that the lithium doping time was changed to 20 hours. As a result of the determination of the lithium content in the same manner as in Example B1, it turned out that the composition formula of the obtained powder was Li$_{0.51}$TiS$_2$.

Example B6

Lithium doping was performed in the same manner as in Example B1, except that the raw material ratio was changed to a weight ratio of TiS$_2$ (with a purity of 99.9%, manufactured by Sigma-Aldrich Co. LLC.):lithium-containing complex hydride (LiBH$_4$, with a purity of 90%, manufactured by Sigma-Aldrich Co. LLC.)=4:1. As a result of the determination of the lithium content in the same manner as in Example B1, it turned out that the composition formula of the obtained powder was Li$_{0.35}$TiS$_2$. Despite that the ratio of LiBH$_4$ was lower in Example B6 than in Example B4, the amount of lithium doping was larger in Example B6 than in Example B4 in the result. Since the production lots of LiBH$_4$ used for the reaction were different, a slight difference in particle size of LiBH$_4$ between Example B4 and Example B6 may possibly have affected the results. That is, it is inferred that a difference in particle size of LiBH$_4$ can cause a difference in reaction speed.

Example B7

Lithium doping was performed in the same manner as in Example B2, except that the raw material ratio was changed to a weight ratio of TiS$_2$ (with a purity of 99.9%, manufactured by Sigma-Aldrich Co. LLC.):lithium-containing complex hydride (LiBH$_4$, with a purity of 90%, manufactured by Sigma-Aldrich Co. LLC.)=5:1. As a result of the determination of the lithium content in the same manner as in Example B1, it turned out that the composition formula of the obtained powder was Li$_{0.02}$TiS$_2$.

Example B8

(1) Production of Solid-State Battery Before Lithium Doping

Powders were weighed out within a glove box in a weight ratio of sulfur-based electrode active material TiS$_2$ (with a purity of 99.9%, manufactured by Sigma-Aldrich Co. LLC.):lithium-containing complex hydride (LiBH$_4$)=2:3 and mixed in a mortar. The mixture was put into a 10-mm diameter powder tableting machine and was press-formed at a pressure of 28 MPa into a disk shape (formation of positive-electrode layer). Without taking out the formed product, the complex hydride solid electrolyte (LiBH$_4$) powder was subsequently put into the tableting machine and was press-formed again at a pressure of 28 MPa (formation of solid-electrolyte layer). To the surface of the solid electrolyte layer opposite to the positive-electrode layer, an indium foil with a thickness of 100 μm and a diameter of 8 mm was attached, and was integrally formed at a pressure of 285 MPa. Thus, a disk-shaped pellet in which 75 μm of the positive-electrode layer, 500 μm of the complex hydride solid electrolyte layer, and 70 μm of the negative-electrode layer (In indium foil was spread to a diameter of 9 mm) were sequentially laminated together was obtained. The pellet was put in a battery test cell made of SUS304, to produce a solid-state battery before lithium doping (with neither the positive electrode nor the negative electrode retaining the amount of lithium necessary for charge and discharge).

(2) Lithium Doping

The aforementioned solid-state battery before lithium doping was subjected to lithium doping by heating at 120° C. for 2 hours. The sulfur-based electrode active material was doped with lithium by this operation, so that charge and discharge were enabled.

(3) Charge-Discharge Test

The charge-discharge test for the solid-state battery produced as above was started with charge at a constant current, a measurement temperature of 120° C., a cut-off voltage of 1.15 to 2.25 V, and a rate of 0.1 C, using a potentiostat/galvanostat (VMP3, manufactured by Bio-Logic Science Instruments). The transition in discharge capacity to the 20th cycle is shown in FIG. 8, and the charge-discharge curves at the 1st, 2nd, and 20th cycles are shown in FIG. 9. It should be noted that the discharge capacity was expressed by taking the discharge capacity obtained in the tested battery as a value per gram of the sulfur-based electrode active material. The composition of the sulfur-based electrode active material after lithium doping, as determined from the Coulomb force during discharge at the 1st cycle, was Li$_{0.84}$TiS$_2$ (where the theoretical capacity per gram of TiS$_2$ was assumed to be 239 mAh).

For Examples B1 to B7, the lithium doping conditions; the a- and c-axis lattice constants determined from the X-ray diffraction; the amounts of lithium insertion determined respectively from the a- and c-axis lattice constants using FIG. 7; and the average of the aforementioned amounts of lithium insertion are collectively shown in Table 3 below.

Further, the a- and c-axis lattice constants of TiS$_2$ free of lithium are shown as Reference B1, and the a- and c-axis lattice constants of LiTiS$_2$ containing lithium from the start are shown as Reference B2.

TABLE 3

Variation of a- and c-axis lattice constants and amount of Li inserted in lithium doping

| | Combination | Weight ratio | Molar ratio Li/Ti | Reaction time hr | a-axis nm | Amount of Li inserted from a-axis X: $Li_xTiS_2$ | c-axis nm | Amount of Li inserted from c-axis X: $Li_xTiS_2$ | Average amount of Li inserted X: $Li_xTiS_2$ |
|---|---|---|---|---|---|---|---|---|---|
| Example B1 | $TiS_2$, $LiBH_4$ | 2:3 | 7.7 | 2 | 0.34360 | 0.66 | 0.61900 | 0.95 | 0.80 |
| Example B2 | $TiS_2$, $LiBH_4$ | 2:3 | 7.7 | 20 | 0.34576 | 0.94 | 0.61903 | 0.95 | 0.95 |
| Example B3 | $TiS_2$, $3LiBH_4$—LiI | 2:3 | 3.4 | 2 | 0.34360 | 0.66 | 0.61822 | 0.67 | 0.66 |
| Example B4 | $TiS_2$, $LiBH_4$ | 3:1 | 1.7 | 2 | 0.34081 | 0 | 0.58405 | 0.10 | 0.05 |
| Example B5 | $TiS_2$, $LiBH_4$ | 3:1 | 1.7 | 20 | 0.34245 | 0.46 | 0.61757 | 0.56 | 0.51 |
| Example B6 | $TiS_2$, $LiBH_4$ | 4:1 | 1.3 | 2 | 0.34160 | 0.27 | 0.61400 | 0.43 | 0.35 |
| Example B7 | $TiS_2$, $LiBH_4$ | 5:1 | 1 | 20 | 0.34074 | 0 | 0.57610 | 0.03 | 0.02 |
| Reference B1 | $TiS_2$ | | | | 0.34061 | | 0.56986 | | 0 |
| Reference B2 | $LiTiS_2$ | | | | 0.34590 | | 0.61879 | | 1 |

It can be seen from Table 3 above that the sulfur-based electrode active materials of the examples were doped with lithium in an amount sufficient for the electrode reaction.

REFERENCE SIGNS LIST

1: Positive-electrode layer, 2: Solid-electrolyte layer, 3: Negative-electrode layer, 10: Solid-state battery

The invention claimed is:

1. A solid-state battery comprising:
a positive-electrode layer;
a negative-electrode layer; and
a lithium-ion-conducting solid electrolyte layer disposed between the positive-electrode layer and the negative-electrode layer, wherein
the positive-electrode layer contains a positive-electrode active material and a complex hydride solid electrolyte,
the positive-electrode active material is a sulfur-based electrode active material comprising a sulfur-polyacrylonitrile, S-carbon composite, or NiS, and
the solid electrolyte layer contains a complex hydride solid electrolyte.

2. The solid-state battery according to claim 1, wherein the sulfur-based electrode active material is selected from the group consisting of S-carbon composite, and NiS.

3. The solid-state battery according to claim 1, wherein the complex hydride solid electrolyte is $LiBH_4$ or a combination of $LiBH_4$ and an alkali metal compound represented by Formula (1) below:

$$MX \qquad (1),$$

wherein M represents an alkali metal atom selected from the group consisting of a lithium atom, a rubidium atom, and a cesium atom, and X represents a halogen atom or an $NH_2$ group.

4. The solid-state battery according to claim 3, wherein the alkali metal compound is selected from the group consisting of a rubidium halide, a lithium halide, a cesium halide, and a lithium amide.

5. The solid-state battery according to claim 1, wherein the positive-electrode layer is formed by pressing.

* * * * *